United States Patent
Rajan et al.

(10) Patent No.: US 9,141,961 B2
(45) Date of Patent: *Sep. 22, 2015

(54) MANAGEMENT OF DYNAMIC MOBILE COUPONS

(75) Inventors: Rajeev Rajan, San Diego, CA (US); Ricardo dos Santos, San Diego, CA (US); Paul E. Jacobs, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 648 days.

This patent is subject to a terminal disclaimer.

(21) Appl. No.: 12/574,045

(22) Filed: Oct. 6, 2009

(65) Prior Publication Data

US 2010/0185504 A1    Jul. 22, 2010

Related U.S. Application Data

(63) Continuation-in-part of application No. 12/142,159, filed on Jun. 19, 2008, and a continuation-in-part of application No. 12/142,597, filed on Jun. 19, 2008.

(60) Provisional application No. 60/945,098, filed on Jun. 20, 2007, provisional application No. 60/945,100, filed on Jun. 20, 2007, provisional application No. 61/230,693, filed on Aug. 1, 2009.

(51) Int. Cl.
*G06Q 30/00* (2012.01)
*G06Q 30/02* (2012.01)
(Continued)

(52) U.S. Cl.
CPC ............ *G06Q 30/02* (2013.01); *G06Q 30/0211* (2013.01); *G06Q 30/0214* (2013.01);
(Continued)

(58) Field of Classification Search
None
See application file for complete search history.

(56) References Cited

U.S. PATENT DOCUMENTS

| 4,006,477 A | 2/1977 | Yost, Jr. et al. |
| 5,382,957 A | 1/1995 | Blume |

(Continued)

FOREIGN PATENT DOCUMENTS

| CN | 1432949 A | 7/2003 |
| CN | 1633660 A | 6/2005 |

(Continued)

OTHER PUBLICATIONS

Bardia Alavi, Kaveh Pahlavan, Nayef A. Alsindi, Xinro ng Li, "Indoor Geolocat ion Distance Error Modeling using UWB Channel Measurements" ,2005 IEEE 16th International Symposium on Personal, Indoor and Mobile Radio Communications, Sep. 11-14, 2005.

(Continued)

*Primary Examiner* — Matthew T Sittner
(74) *Attorney, Agent, or Firm* — Shirin Tefagh

(57) ABSTRACT

Providing for network-based management of dynamic mobile coupons (DMCs) employed in mobile device-related commerce is described herein. Management can include mitigating processing load involved in processing dynamic characteristics of a set of DMCs, facilitating post-transaction evaluation of DMCs, or facilitating a virtual shopping experience in conjunction with redeeming DMCs in a mobile-commerce environment. Communicative association between a mobile device and network components can be implemented to leverage data collected by the mobile device with communication and processing capabilities of the network. Dynamic DMC states are determined from the collected data, which are implemented to facilitate the mobile-commerce. The disclosure provides an integrated mechanism for efficient utilization of DMCs to enhance user experience and satisfaction with mobile commerce.

26 Claims, 14 Drawing Sheets

(51) Int. Cl.
*G06Q 30/06* (2012.01)
*H04M 15/00* (2006.01)
*H04W 4/24* (2009.01)
*H04L 29/08* (2006.01)

(52) U.S. Cl.
CPC ........ *G06Q30/0222* (2013.01); *G06Q 30/0224* (2013.01); *G06Q 30/06* (2013.01); *H04L 67/306* (2013.01); *H04M 15/00* (2013.01); *H04M 15/68* (2013.01); *H04M 15/888* (2013.01); *H04W 4/24* (2013.01); *H04L 67/04* (2013.01); *H04L 67/22* (2013.01); *H04M 2215/0192* (2013.01); *H04M 2215/0196* (2013.01)

(56) References Cited

U.S. PATENT DOCUMENTS

| | | |
|---|---|---|
| 5,687,169 A | 11/1997 | Fullerton |
| 5,764,696 A | 6/1998 | Barnes et al. |
| 5,812,081 A | 9/1998 | Fullerton |
| 5,832,035 A | 11/1998 | Fullerton |
| 5,907,427 A | 5/1999 | Scalora et al. |
| 5,952,956 A | 9/1999 | Fullerton |
| 5,960,031 A | 9/1999 | Fullerton et al. |
| 5,963,581 A | 10/1999 | Fullerton et al. |
| 5,969,663 A | 10/1999 | Fullerton et al. |
| 5,970,148 A | 10/1999 | Meier |
| 5,995,534 A | 11/1999 | Fullerton et al. |
| 6,025,795 A | 2/2000 | Hulderman et al. |
| 6,031,862 A | 2/2000 | Fullerton et al. |
| 6,091,374 A | 7/2000 | Barnes |
| 6,111,536 A | 8/2000 | Richards et al. |
| 6,133,876 A | 10/2000 | Fullerton et al. |
| 6,177,903 B1 | 1/2001 | Fullerton et al. |
| 6,218,979 B1 | 4/2001 | Barnes et al. |
| 6,295,019 B1 | 9/2001 | Richards et al. |
| 6,297,773 B1 | 10/2001 | Fullerton et al. |
| 6,300,903 B1 | 10/2001 | Richards et al. |
| 6,304,623 B1 | 10/2001 | Richards et al. |
| 6,332,193 B1 | 12/2001 | Glass et al. |
| 6,351,652 B1 | 2/2002 | Finn et al. |
| 6,354,946 B1 | 3/2002 | Finn |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,611,811 B1 * | 8/2003 | Deaton et al. ............... 705/14.39 |
| 6,614,384 B2 | 9/2003 | Hall et al. |
| 6,614,387 B1 | 9/2003 | Deadman |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,650,894 B1 | 11/2003 | Berstis et al. |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,764 B2 | 8/2004 | Ghosh et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,844,816 B1 | 1/2005 | Melton et al. |
| 6,845,253 B1 | 1/2005 | Schantz |
| 6,847,675 B2 | 1/2005 | Fullerton et al. |
| 6,862,575 B1 * | 3/2005 | Anttila et al. ............... 705/14.14 |
| 6,879,878 B2 | 4/2005 | Glenn et al. |
| 6,882,301 B2 | 4/2005 | Fullerton |
| 6,895,034 B2 | 5/2005 | Nunally et al. |
| 6,895,236 B2 | 5/2005 | Shuster |
| 6,898,434 B2 | 5/2005 | Pradhan et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,907,270 B1 | 6/2005 | Blanz |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,961,285 B2 | 11/2005 | Niemiec et al. |
| 6,961,541 B2 | 11/2005 | Overy et al. |
| 6,963,727 B2 | 11/2005 | Shreve |
| 6,980,613 B2 | 12/2005 | Krivokapic |
| 6,989,751 B2 | 1/2006 | Richards |
| 7,002,473 B2 | 2/2006 | Glick et al. |
| 7,003,289 B1 | 2/2006 | Kolls |
| 7,010,290 B2 | 3/2006 | Dent |
| 7,015,793 B2 | 3/2006 | Gabig, Jr. et al. |
| 7,020,224 B2 | 3/2006 | Krivokapic |
| 7,026,983 B2 | 4/2006 | Spratt |
| 7,027,425 B1 | 4/2006 | Fullerton et al. |
| 7,027,483 B2 | 4/2006 | Santhoff et al. |
| 7,027,493 B2 | 4/2006 | Richards |

(56) References Cited

U.S. PATENT DOCUMENTS

| | | |
|---|---|---|
| 7,030,806 B2 | 4/2006 | Fullerton |
| 7,039,392 B2 | 5/2006 | McCorkle et al. |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,058,414 B1 | 6/2006 | Rofheart et al. |
| 7,069,111 B2 | 6/2006 | Glenn et al. |
| 7,075,476 B2 | 7/2006 | Kim |
| 7,079,827 B2 | 7/2006 | Richards et al. |
| 7,098,769 B2 | 8/2006 | Ott |
| 7,099,367 B2 | 8/2006 | Richards et al. |
| 7,099,368 B2 | 8/2006 | Santhoff et al. |
| 7,116,266 B1 | 10/2006 | Vesel et al. |
| 7,119,659 B2 | 10/2006 | Bonalle et al. |
| 7,129,886 B2 | 10/2006 | Hall et al. |
| 7,132,975 B2 | 11/2006 | Fullerton et al. |
| 7,139,647 B2 | 11/2006 | Larsen |
| 7,145,954 B1 | 12/2006 | Pendergrass et al. |
| 7,148,791 B2 | 12/2006 | Grisham et al. |
| 7,149,533 B2 | 12/2006 | Laird et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,178,719 B2 | 2/2007 | Silverbrook et al. |
| 7,181,192 B2 | 2/2007 | Panasik et al. |
| 7,184,938 B1 | 2/2007 | Lansford et al. |
| 7,188,244 B2 | 3/2007 | Matsuno |
| 7,190,722 B2 | 3/2007 | Lakkis et al. |
| 7,190,729 B2 | 3/2007 | Siwiak |
| 7,206,334 B2 | 4/2007 | Siwiak |
| 7,206,559 B2 | 4/2007 | Meade et al. |
| 7,209,724 B2 | 4/2007 | Richards et al. |
| 7,209,753 B2 | 4/2007 | Raith |
| 7,230,980 B2 | 6/2007 | Langford et al. |
| 7,239,277 B2 | 7/2007 | Fullerton et al. |
| 7,245,900 B1 | 7/2007 | Lamb et al. |
| RE39,759 E | 8/2007 | Fullerton |
| 7,256,727 B2 | 8/2007 | Fullerton et al. |
| 7,271,779 B2 | 9/2007 | Hertel |
| 7,277,715 B2 | 10/2007 | Starr et al. |
| 7,308,356 B2 | 12/2007 | Melaku et al. |
| 7,310,532 B2 | 12/2007 | Knauerhase et al. |
| 7,363,494 B2 | 4/2008 | Brainard et al. |
| 7,366,509 B2 | 4/2008 | Akgun et al. |
| 7,383,984 B2 | 6/2008 | Silverbrook et al. |
| 7,398,392 B2 | 7/2008 | Weber |
| 7,505,443 B2 | 3/2009 | McNew et al. |
| 7,554,979 B2 | 6/2009 | Ikeda |
| 7,581,113 B2 | 8/2009 | Smith et al. |
| 7,724,705 B2 | 5/2010 | Erola et al. |
| 7,739,157 B2 | 6/2010 | Bonner et al. |
| 7,783,532 B2 | 8/2010 | Hsu et al. |
| 7,818,762 B2 | 10/2010 | Liu et al. |
| 7,870,021 B2 | 1/2011 | Mankoff |
| 7,870,229 B2 | 1/2011 | Spector |
| 8,332,270 B2 | 12/2012 | Sprigg et al. |
| 8,552,903 B2 | 10/2013 | Julian et al. |
| 8,595,070 B1 | 11/2013 | Barnes et al. |
| 2001/0014870 A1 | 8/2001 | Saito et al. |
| 2001/0042010 A1* | 11/2001 | Hassell ............................ 705/14 |
| 2002/0002504 A1 | 1/2002 | Engel et al. |
| 2002/0004783 A1* | 1/2002 | Paltenghe et al. ................ 705/41 |
| 2002/0010627 A1* | 1/2002 | Lerat ................................ 705/14 |
| 2002/0046084 A1 | 4/2002 | Steele et al. |
| 2002/0065713 A1* | 5/2002 | Awada et al. .................... 705/14 |
| 2002/0091569 A1* | 7/2002 | Kitaura et al. ................... 705/14 |
| 2002/0091571 A1* | 7/2002 | Thomas et al. .................. 705/14 |
| 2002/0107738 A1* | 8/2002 | Beach et al. ..................... 705/14 |
| 2002/0111140 A1 | 8/2002 | Kim |
| 2002/0111907 A1 | 8/2002 | Ling |
| 2002/0116271 A1* | 8/2002 | Mankoff ........................... 705/14 |
| 2002/0117544 A1 | 8/2002 | Wolf et al. |
| 2002/0128903 A1* | 9/2002 | Kernahan ......................... 705/14 |
| 2002/0138345 A1* | 9/2002 | Dickson et al. .................. 705/14 |
| 2002/0138346 A1 | 9/2002 | Kodaka et al. |
| 2002/0169665 A1* | 11/2002 | Hughes et al. ................... 705/14 |
| 2002/0169668 A1* | 11/2002 | Bank et al. ....................... 705/14 |
| 2002/0169892 A1 | 11/2002 | Miyaoku et al. |
| 2002/0178060 A1* | 11/2002 | Sheehan .......................... 705/14 |
| 2002/0194303 A1 | 12/2002 | Suila et al. |
| 2003/0004808 A1 | 1/2003 | Elhaoussine et al. |
| 2003/0004821 A1 | 1/2003 | Dutta et al. |
| 2003/0055726 A1 | 3/2003 | Sohya et al. |
| 2003/0074259 A1* | 4/2003 | Slyman et al. ................... 705/14 |
| 2003/0093283 A1 | 5/2003 | Morsa |
| 2003/0093314 A1* | 5/2003 | Leung et al. ..................... 705/14 |
| 2003/0108009 A1 | 6/2003 | Petersen |
| 2003/0115152 A1* | 6/2003 | Flaherty ............................ 705/65 |
| 2003/0117635 A1 | 6/2003 | Roberts |
| 2003/0158796 A1 | 8/2003 | Balent |
| 2003/0195806 A1* | 10/2003 | Willman et al. ................. 705/14 |
| 2003/0217153 A1* | 11/2003 | Rao et al. ........................ 709/226 |
| 2003/0233190 A1 | 12/2003 | Jones |
| 2004/0054592 A1* | 3/2004 | Hernblad ......................... 705/15 |
| 2004/0054732 A1 | 3/2004 | Carter et al. |
| 2004/0064351 A1 | 4/2004 | Mikurak |
| 2004/0117250 A1 | 6/2004 | Lubow et al. |
| 2004/0137886 A1* | 7/2004 | Ross et al. .................. 455/414.1 |
| 2004/0143500 A1 | 7/2004 | Lopez et al. |
| 2004/0156326 A1 | 8/2004 | Chithambaram |
| 2004/0158490 A1 | 8/2004 | Sakamura et al. |
| 2004/0158492 A1 | 8/2004 | Lopez et al. |
| 2004/0203963 A1* | 10/2004 | Shivaram et al. .............. 455/466 |
| 2004/0218574 A1 | 11/2004 | Sata et al. |
| 2004/0222302 A1 | 11/2004 | Matsumori |
| 2004/0233621 A1 | 11/2004 | Maeoka et al. |
| 2004/0240565 A1 | 12/2004 | Santhoff et al. |
| 2004/0243519 A1 | 12/2004 | Perttila et al. |
| 2004/0254836 A1* | 12/2004 | Emoke Barabas et al. ...... 705/14 |
| 2005/0004840 A1 | 1/2005 | Wanninger |
| 2005/0027984 A1 | 2/2005 | Saito et al. |
| 2005/0038574 A1 | 2/2005 | Gila et al. |
| 2005/0040230 A1 | 2/2005 | Swartz et al. |
| 2005/0114213 A1 | 5/2005 | Smith et al. |
| 2005/0131761 A1* | 6/2005 | Trika et al. ....................... 705/14 |
| 2005/0132234 A1 | 6/2005 | Dawson |
| 2005/0135304 A1 | 6/2005 | Wentink et al. |
| 2005/0138576 A1 | 6/2005 | Baumert et al. |
| 2005/0184145 A1 | 8/2005 | Law et al. |
| 2005/0200671 A1 | 9/2005 | Mistry et al. |
| 2005/0204152 A1 | 9/2005 | Breitbach |
| 2005/0230473 A1* | 10/2005 | Fajkowski ...................... 235/383 |
| 2005/0237270 A1 | 10/2005 | Adams et al. |
| 2006/0003776 A1 | 1/2006 | Natori et al. |
| 2006/0014532 A1 | 1/2006 | Seligmann et al. |
| 2006/0015404 A1 | 1/2006 | Tran |
| 2006/0026070 A1* | 2/2006 | Sun ................................... 705/14 |
| 2006/0030341 A1 | 2/2006 | Pham |
| 2006/0068822 A1 | 3/2006 | Kalhan |
| 2006/0073851 A1 | 4/2006 | Colando et al. |
| 2006/0074784 A1* | 4/2006 | Brown .............................. 705/35 |
| 2006/0111967 A1* | 5/2006 | Forbes ............................. 705/14 |
| 2006/0130100 A1* | 6/2006 | Pentland ........................... 725/68 |
| 2006/0171388 A1 | 8/2006 | Ikeda |
| 2006/0177030 A1 | 8/2006 | Rajagopalan et al. |
| 2006/0178932 A1* | 8/2006 | Lang ................................ 705/14 |
| 2006/0180664 A1 | 8/2006 | Barrett et al. |
| 2006/0194569 A1 | 8/2006 | Hsueh |
| 2006/0293968 A1* | 12/2006 | Brice et al. ....................... 705/26 |
| 2007/0017259 A1 | 1/2007 | Cho et al. |
| 2007/0043626 A1* | 2/2007 | Duvall et al. .................... 705/26 |
| 2007/0057051 A1* | 3/2007 | Bortolin et al. ................ 235/383 |
| 2007/0061302 A1 | 3/2007 | Ramer et al. |
| 2007/0087732 A1* | 4/2007 | Hsueh ......................... 455/414.4 |
| 2007/0124209 A1 | 5/2007 | Walker et al. |
| 2007/0131759 A1* | 6/2007 | Cox et al. ....................... 235/380 |
| 2007/0136657 A1* | 6/2007 | Blumenthal et al. .......... 715/512 |
| 2007/0136775 A1* | 6/2007 | MacKay et al. ............... 725/106 |
| 2007/0138270 A1* | 6/2007 | Reblin ............................ 235/383 |
| 2007/0150339 A1* | 6/2007 | Retter et al. ..................... 705/14 |
| 2007/0173266 A1 | 7/2007 | Barnes, Jr. |
| 2007/0174116 A1 | 7/2007 | Keith et al. |
| 2007/0174259 A1* | 7/2007 | Amjadi ............................. 707/3 |
| 2007/0182546 A1 | 8/2007 | Virk et al. |

(56) References Cited

U.S. PATENT DOCUMENTS

| | | |
|---|---|---|
| 2007/0200671 A1 | 8/2007 | Kelley et al. |
| 2007/0203792 A1* | 8/2007 | Rao ................... 705/14 |
| 2007/0241189 A1 | 10/2007 | Slavin et al. |
| 2007/0249288 A1 | 10/2007 | Moallemi et al. |
| 2007/0259690 A1 | 11/2007 | Julian et al. |
| 2007/0270129 A1 | 11/2007 | Luo |
| 2007/0276537 A1* | 11/2007 | Walker et al. ........... 700/238 |
| 2007/0285306 A1 | 12/2007 | Julian et al. |
| 2007/0287386 A1 | 12/2007 | Agrawal et al. |
| 2008/0040229 A1* | 2/2008 | Gholston ................... 705/14 |
| 2008/0052169 A1* | 2/2008 | O'Shea et al. ............ 705/14 |
| 2008/0072066 A1 | 3/2008 | Vogler et al. |
| 2008/0074264 A1 | 3/2008 | Sharpe et al. |
| 2008/0077484 A1 | 3/2008 | Main et al. |
| 2008/0120186 A1* | 5/2008 | Jokinen et al. .......... 705/14 |
| 2008/0133349 A1* | 6/2008 | Nazer et al. ............. 705/14 |
| 2008/0133366 A1* | 6/2008 | Evans et al. ............. 705/14 |
| 2008/0154714 A1 | 6/2008 | Liu et al. |
| 2008/0154827 A1 | 6/2008 | Connors |
| 2008/0167991 A1* | 7/2008 | Carlson et al. .......... 705/50 |
| 2008/0189170 A1 | 8/2008 | Ramachandra |
| 2008/0208688 A1 | 8/2008 | Byerley et al. |
| 2008/0221984 A1* | 9/2008 | Abhyanker ............... 705/14 |
| 2008/0238615 A1 | 10/2008 | Carpenter |
| 2008/0240440 A1 | 10/2008 | Rose et al. |
| 2008/0262928 A1* | 10/2008 | Michaelis ................. 705/14 |
| 2008/0270231 A1 | 10/2008 | Li et al. |
| 2008/0300970 A1* | 12/2008 | Scheibe ..................... 705/14 |
| 2008/0300984 A1 | 12/2008 | Li |
| 2009/0061884 A1 | 3/2009 | Rajan et al. |
| 2009/0076911 A1 | 3/2009 | Vo et al. |
| 2009/0076912 A1 | 3/2009 | Rajan et al. |
| 2009/0088182 A1 | 4/2009 | Piersol et al. |
| 2009/0098903 A1 | 4/2009 | Donaldson et al. |
| 2009/0108064 A1 | 4/2009 | Fernandes et al. |
| 2009/0164309 A1 | 6/2009 | Mgrdechian et al. |
| 2009/0178144 A1 | 7/2009 | Redlich et al. |
| 2009/0233575 A1 | 9/2009 | Morrison |
| 2010/0066498 A1 | 3/2010 | Fenton |
| 2010/0153205 A1* | 6/2010 | Retter et al. ........... 705/14.26 |
| 2010/0174615 A1 | 7/2010 | Weaver |
| 2010/0205043 A1* | 8/2010 | Edwards ................... 705/10 |
| 2010/0241574 A1 | 9/2010 | Salazar |
| 2010/0257020 A1 | 10/2010 | Bryant et al. |
| 2010/0280960 A1 | 11/2010 | Ziotopoulos et al. |
| 2010/0289640 A1 | 11/2010 | Annamalai |
| 2010/0299224 A1 | 11/2010 | Borom et al. |
| 2011/0028160 A1 | 2/2011 | Roeding et al. |
| 2011/0119132 A1 | 5/2011 | Morton et al. |
| 2011/0215138 A1 | 9/2011 | Crum |
| 2011/0250901 A1 | 10/2011 | Grainger et al. |
| 2011/0276385 A1 | 11/2011 | Keller |
| 2012/0239500 A1 | 9/2012 | Monahan |
| 2013/0006773 A1 | 1/2013 | Lutnick et al. |
| 2013/0030915 A1 | 1/2013 | Statler et al. |
| 2015/0017951 A1 | 1/2015 | Agrawal et al. |
| 2015/0024689 A1 | 1/2015 | Agrawal |

FOREIGN PATENT DOCUMENTS

| | | |
|---|---|---|
| CN | 1672382 | 9/2005 |
| CN | 1694122 A | 11/2005 |
| CN | 1716223 A | 1/2006 |
| CN | 1799061 A | 7/2006 |
| CN | 1879121 A | 12/2006 |
| CN | 101384031 A | 3/2009 |
| CN | 101731017 A | 6/2010 |
| EP | 1758308 A1 | 2/2007 |
| EP | 1926335 A1 | 5/2008 |
| EP | 2184927 A1 | 5/2010 |
| JP | 11353555 A | 12/1999 |
| JP | 2000275328 A | 10/2000 |
| JP | 2001034658 A | 2/2001 |
| JP | 2001145785 A | 5/2001 |
| JP | 2001223712 A | 8/2001 |
| JP | 2001325507 A | 11/2001 |
| JP | 2002073666 A | 3/2002 |
| JP | 2002074131 A | 3/2002 |
| JP | 2002109237 A | 4/2002 |
| JP | 2002132886 A | 5/2002 |
| JP | 2002149945 A | 5/2002 |
| JP | 2002150102 A | 5/2002 |
| JP | 2002525641 A | 8/2002 |
| JP | 2002251555 A | 9/2002 |
| JP | 2002279274 A | 9/2002 |
| JP | 2002291047 | 10/2002 |
| JP | 2002374261 A | 12/2002 |
| JP | 2003006543 A | 1/2003 |
| JP | 2003023367 A | 1/2003 |
| JP | 2003051771 | 2/2003 |
| JP | 2003067606 A | 3/2003 |
| JP | 2003115001 A | 4/2003 |
| JP | 2003187140 A | 7/2003 |
| JP | 2003208381 A | 7/2003 |
| JP | 2003256705 A | 9/2003 |
| JP | 2003263582 A | 9/2003 |
| JP | 2004094543 A | 3/2004 |
| JP | 2004516989 A | 6/2004 |
| JP | 2004220522 A | 8/2004 |
| JP | 2004236166 A | 8/2004 |
| JP | 2004248215 A | 9/2004 |
| JP | 2004272463 A | 9/2004 |
| JP | 2004326303 A | 11/2004 |
| JP | 2004328542 A | 11/2004 |
| JP | 2004334885 A | 11/2004 |
| JP | 2004362470 A | 12/2004 |
| JP | 2005011318 A | 1/2005 |
| JP | 2005020350 A | 1/2005 |
| JP | 2005045756 A | 2/2005 |
| JP | 2005078173 A | 3/2005 |
| JP | 2005128903 A | 5/2005 |
| JP | 2005128965 A | 5/2005 |
| JP | 2005141686 A | 6/2005 |
| JP | 2005209114 A | 8/2005 |
| JP | 2005528016 A | 9/2005 |
| JP | 2005533316 A | 11/2005 |
| JP | 2005534260 A | 11/2005 |
| JP | 2006011806 A | 1/2006 |
| JP | 2006018511 A | 1/2006 |
| JP | 2006018824 A | 1/2006 |
| JP | 2006020004 A | 1/2006 |
| JP | 2006091355 A | 4/2006 |
| JP | 2006129000 A | 5/2006 |
| JP | 2006139431 A | 6/2006 |
| JP | 2006197458 | 7/2006 |
| JP | 2006227901 A | 8/2006 |
| JP | 2006246433 A | 9/2006 |
| JP | 2006295249 A | 10/2006 |
| JP | 2007025854 A | 2/2007 |
| JP | 2007502087 A | 2/2007 |
| JP | 2007072906 A | 3/2007 |
| JP | 2007133461 A | 5/2007 |
| JP | 2007201851 A | 8/2007 |
| JP | 2007213276 A | 8/2007 |
| JP | 2008225540 A | 9/2008 |
| JP | 2008293123 A | 12/2008 |
| JP | 2009104350 A | 5/2009 |
| JP | 2009188922 | 8/2009 |
| JP | 2010515168 A | 5/2010 |
| JP | 2013500538 A | 1/2013 |
| KR | 1020020068945 | 8/2002 |
| KR | 20020096946 A | 12/2002 |
| KR | 20030011744 A | 2/2003 |
| KR | 20030018741 A | 3/2003 |
| KR | 20040020309 A | 3/2004 |
| KR | 20040069122 A | 8/2004 |
| KR | 100512362 B1 | 9/2005 |
| KR | 20060014942 A | 2/2006 |
| KR | 20060018235 A | 2/2006 |
| KR | 20060064222 A | 6/2006 |
| KR | 20060124430 A | 12/2006 |
| KR | 20070016301 | 2/2007 |
| RU | 2150790 C1 | 6/2000 |

(56) References Cited

FOREIGN PATENT DOCUMENTS

| | | |
|---|---|---|
| RU | 2267156 C2 | 12/2005 |
| RU | 20050100782 | 2/2006 |
| RU | 2301450 C2 | 6/2007 |
| TW | I228364 | 2/2005 |
| TW | I252324 | 4/2006 |
| TW | I252628 | 4/2006 |
| TW | I252639 | 4/2006 |
| TW | I252671 | 4/2006 |
| WO | WO9613920 A1 | 5/1996 |
| WO | WO0178423 A1 | 10/2001 |
| WO | 0221478 | 3/2002 |
| WO | WO0225823 | 3/2002 |
| WO | 0250732 A1 | 6/2002 |
| WO | WO02054353 A1 | 7/2002 |
| WO | WO03107289 | 12/2003 |
| WO | 2004008276 A2 | 1/2004 |
| WO | WO-2004014037 A1 | 2/2004 |
| WO | 2005045455 A2 | 5/2005 |
| WO | WO-2005064515 A1 | 7/2005 |
| WO | 2005110208 A1 | 11/2005 |
| WO | 2005122483 A1 | 12/2005 |
| WO | WO2006030341 | 3/2006 |
| WO | WO2006092772 A1 | 9/2006 |
| WO | 2007026745 A1 | 3/2007 |
| WO | WO2008027965 | 3/2008 |
| WO | 2008146576 A1 | 12/2008 |
| WO | WO2008157806 | 12/2008 |
| WO | 2009140438 A1 | 11/2009 |
| WO | 2010096617 A2 | 8/2010 |
| WO | 2011014292 A1 | 2/2011 |

OTHER PUBLICATIONS

Blundo, C. et al.: "Secure E-Coupons," Electronic Commerce Research, vol. 5, No. 1, pp. 117-139, Kluwer, Dordrecht, NL, (Jan. 1, 2005), XP002380651, ISSN: 1389-5753, Section 8.4.

International Search Report and Written Opinion—PCT/US2010/043776—ISA/EPO—Apr. 20, 2011.

"Examples of Judging whether Business-Related Inventions are Patentable" http://www.jpo.go.jp/tetuzuki/t_tokkyo/bijinesu/biz_pat_case.htm, 2003.

Okazaki, "Eight Methods for Capitalizing on Access Log Analysis, which are Essential to SEO, Marketing and Redesign", Web Creators, NdN Corporation, Japan, Mar. 1, 2005, vol. 39, pp. 148-155.

Lester, J et al., ""Are You With Me ?"—Using Accelerometers to Determine if Two Devices are Carried by the Same Person", LNCS, Pervasive Computing, Apr. 2004,vol. 3001, pp. 33-50.

"Digital Watermarking Alliance", Oct. 19, 2006, 8 pages, Retrieved from the Internet: URL: http://www.digitalwatermarkingalliance.org/faqs.asp [retrieved on Jul. 21, 2014].

!Tao T., "Relationship Mechanism for Dynamic and User Preference-Aware Service Creation", Journal of the Information Processing Society of Japan, Japan, IPSJ, Mar. 15, 2003, vol. 44, No. 3, pp. 812-825.

Kirovski D., et al., "Spread Spectrum Watermarking of Audio Signals", IEEE Transactions on Signal Processing, vol. 51, No. 4, pp. 1020-33, Apr. 2003.

Roumeliotis, T., "Five geofencing ideas for mobile marketing from brands and retailers,". Mobile Commerce Daily, Jul. 16, 2010, 2 pages, Retrieved from http://www.mobilecommercedaily.com/five-geofencing-ideas-for-mobile-marketing-from-brands-and-retailers.

* cited by examiner

MANAGEMENT OF DYNAMIC MOBILE COUPONS

CLAIM OF PRIORITY UNDER 35 U.S.C. §119

This application for patent claims the benefit of U.S. Provisional Application Ser. No. 61/230,693 filed on Aug. 1, 2009 entitled "MANAGEMENT OF DYNAMIC MOBILE COUPONS," the disclosure of which is hereby incorporated by reference in their entirety.

CLAIM FOR BENEFIT UNDER 35 U.S.C. §120

The present application is a continuation in part of U.S. application Ser. No. 12/142,159 entitled DYNAMIC ELECTRONIC COUPON FOR A MOBILE ENVIRONMENT filed Jun. 19, 2008, which claims priority to U.S. Provisional Application No. 60/945,098 entitled DYNAMIC COUPON SYSTEM filed Jun. 20, 2007; and is also a continuation in part of U.S. application Ser. No. 12/142,597 entitled MANAGEMENT OF DYNAMIC ELECTRONIC COUPONS filed Jun. 19, 2008, which claims priority to U.S. Provisional Application No. 60/945,100 entitled COUPON WALLET SYSTEM, filed Jun. 20, 2007, each of which are assigned to the assignee hereof, and hereby expressly incorporated by reference herein.

BACKGROUND

The following relates generally to wireless communication, and more specifically to managing dynamic mobile coupons in mobile commerce.

In recent years, a variety of advancements has occurred in cellular communication technology and cellular communication devices. Some of the advancements, such as integration of camera and video recording technology onto such devices, incorporation of e-mail and short messaging services into mobile communication, and the like, involve software and/or hardware applications. These applications have added increased flexibility, processing power, communication capabilities, and so forth, to already popular communication devices (e.g., cellular telephones). As a result, such devices have become more popular in a consumer marketplace, motivating larger numbers of consumers to purchase such devices, or to upgrade to devices that include new applications and technologies.

As larger numbers of consumers own and utilize mobile devices, business mechanisms traditionally limited to personal, radio, television or landline telephone contact are expanding into the mobile environment. For instance, as the Internet becomes increasingly accessible via mobile communication devices, e-mail and web browsing applications are utilized with mobile devices. Further, electronic commerce is conducted by way of such devices as well. For instance, secure web applications can provide an interface for conducting online commercial transactions with a web browsing device. Credit card, debit card, bank transfer and like payments can be facilitated utilizing secure web applications by way of such device.

In addition to the foregoing, other commercial mechanisms have also been incorporated into mobile devices and mobile communication environments. For instance, mobile coupons stored on and configured for mobile devices (mobile coupons) can be utilized to replace paper coupons. A commercial entity can generate coupons and distribute them to mobile devices, which can in turn facilitate redemption of mobile coupons in conjunction with commercial transactions. As electronic files, such coupons have more flexibility than traditional paper coupons. For instance, a paper coupon is more readily misplaced as compared with a mobile coupon stored on a mobile device. Further, a mobile coupon can incorporate various security measures to mitigate duplication and other unauthorized uses. Accordingly, many benefits accrue upon introduction of mobile coupons in a mobile operating environment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for network-based management of dynamic mobile coupons (DMCs) employed in mobile device-related commerce. Data correlated to variable characteristics of DMCs can be analyzed by network components to determine real time, periodic or triggered, etc., states of the variable characteristics. As network processing load associated with analyzing the data becomes prohibitive, one or more DMCs can be set to non-variable, enabling back-end resources to forego data analysis with respect to the non-variable DMCs, potentially reducing resource load.

According to further aspects of the subject disclosure, provided is post-transaction evaluation of DMC-related activity. Evaluation can be based on a set of post-transaction rules correlating transaction modifiers to post-transaction activity. Data pertaining to post-transaction activity is received and analyzed, and transaction modifiers are implemented as per the post-transaction rules. The transaction modifiers can include adding funds to a user financial account, issuing a rebate check, associating an additional DMC with a user's account, updating user loyalty points or frequent-user points, or the like.

According to one or more other aspects of the subject disclosure, provided is virtual shopping management coupled with DMC allocation. A user DMC account associated with a mobile device is transmitted to a commercial entity via wireless communication, or to a mobile network entity configured to manage DMCs for the commercial entity. The commercial/network entity can cross-reference DMCs associated with the account to products or services of the commercial entity. Modified transactions characteristics specified as part of the DMCs can be applied to one or more products and services and downloaded to the mobile device for display. If a product or service is selected at the mobile device, the selection is sent to the network entity, which generates a virtual invoice for the product or service. The invoice can reflect transaction modifications provided by pertinent DMCs, as well as additional modifications based on a user loyalty or frequent-shopper account, credit card purchase benefits, user points, other coupons, rebates, promotional modifications or instant discounts, or the like. The virtual invoice indicates a final transaction for the selected product/service based on applicable transaction modifications, and can be provided to the mobile device or a point of sale device to facilitate completing the transaction.

In addition to the foregoing, the subject disclosure provides a method including a data processor to execute instructions for managing a DMC. The instructions can cause the data processor to assign the DMC to a target mobile device and to establish an initial state of a variable characteristic of the DMC based on a factor pertinent to the target mobile device or a user account related to such device. Furthermore, the method can comprise employing a communication interface to obtain data pertinent to the DMC. Additionally, the method can comprise employing the data processor to manage a state of a DMC account associated with the target mobile device based on the data pertinent to the DMC.

According to one or more aspects of the subject disclosure, provided is an apparatus for managing mobile coupons. The apparatus can comprise a data processor that executes a set of modules configured for managing a DMC. The set of modules can include an allocation module that assigns the DMC to a mobile device user account, an evaluation module that establishes an initial state of the DMC based on a factor pertinent to the mobile device user account and a management module that maintains a status of the mobile device user account based on data pertinent to the DMC. Furthermore, the apparatus can comprise a database for storing the data pertinent to the DMC, the initial state of the DMC or the status of the mobile device user account.

According to one or more aspects, disclosed is an apparatus for wireless communication. The apparatus can comprise means for processing instructions for managing a DMC. The instructions can cause the means for processing to assign the DMC to a target mobile device and to establish an initial state of a variable characteristic of the DMC based on a factor pertinent to the target mobile device or a user account related to such device. In addition, the apparatus can comprise means for employing a communication interface to obtain data pertinent to the DMC. Moreover, the apparatus can comprise means for managing a state of a DMC account associated with the target mobile device based on the data pertinent to the DMC.

In one or more other aspects, disclosed is at least one processor configured for wireless communication. The processor(s) can comprise a first module for assigning a DMC to a target mobile device. Furthermore, the processor(s) can comprise a second module for establishing an initial state of a variable characteristic of the DMC based on a factor pertinent to the target mobile device or a user account related to such device. Additionally, the processor(s) can comprise a third module for obtaining data pertinent to the DMC and a fourth module for managing a state of a DMC account associated with the target mobile device based on the data pertinent to the DMC.

According to at least one additional aspect, the subject disclosure provides a computer program product comprising a computer-readable medium. The computer-readable medium can include at least one instruction for causing a computer to assign a DMC to a target mobile device. Additionally, the computer-readable medium can include at least one instruction for causing the computer to establish an initial state of a variable characteristic of the DMC based on a factor pertinent to the target mobile device or a user account related to such device. Further, the computer-readable medium can comprise at least one instruction for causing the computer to obtain data pertinent to the DMC. Moreover, the computer-readable medium can comprise at least one instruction for causing the computer to manage a state of a DMC account associated with the target mobile device based on the data pertinent to the DMC.

Further to the above, the subject disclosure provides a method for facilitating management of mobile coupons. The method can comprise employing a data processor to execute rules for maintaining a DMC associated with a mobile device user account. The rules can cause the data processor to obtain an assignment of the DMC to the mobile device user account, obtain a rule for calculating variability of the DMC and to monitor data pertinent to the variability specified by the calculating rule. Furthermore, the method can comprise employing a wireless communication interface to submit the data to a network entity identified by the rule. Moreover, the method can comprise employing the wireless communication interface to obtain a network response to the submission, wherein the response affects the mobile device user account or the DMC.

In at least one other aspect, disclosed is an apparatus for facilitating management of mobile coupons. The apparatus can comprise a data processor for executing a set of modules configured to support the mobile coupon management. The set of modules can include an assignment module that associates a DMC with a user of the apparatus based on assignment of the DMC to a user account and a tracking module that monitors data pertinent to variability of the DMC. Additionally, the set of modules can include a communication module that submits the pertinent data to a network management apparatus and obtains a response affecting the user account or a status of the DMC. Furthermore, the apparatus can include memory for storing the monitored data or the response.

According to other aspects of the subject disclosure, provided is an apparatus for facilitating management of mobile coupons. The apparatus can comprise means for processing rules configured to manage a DMC associated with a mobile device user account. The rules can cause the means for processing to obtain an assignment of the DMC to the mobile device user account and to monitor data pertinent to variability of the DMC. Additionally, the apparatus can comprise means for submitting the data to a network entity and for obtaining a network response to the submission, wherein the response affects the mobile device user account or the DMC.

According to yet other aspects, disclosed is at least one processor configured to facilitate management of mobile coupons. The processor(s) can comprise a first module for obtaining an assignment of a DMC to a mobile device user account and a second module for monitoring data pertinent to variability of the DMC. Furthermore, the processor(s) can comprise a third module for submitting the data to a network entity and for obtaining a network response to the submission, wherein the response affects the mobile device user account or the DMC.

In accordance with at least one additional aspect, the subject disclosure provides a computer program product comprising a computer-readable medium. The computer-readable medium can comprise at least one instruction for causing a computer to obtain an assignment of a DMC to a mobile device user account and at least one instruction for causing the computer to monitor data pertinent to variability of the DMC. Moreover, the computer-readable medium can include at least one instruction for causing the computer to submit the data to a network entity and obtain a network response to the submission, wherein the response affects the mobile device user account or the DMC.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
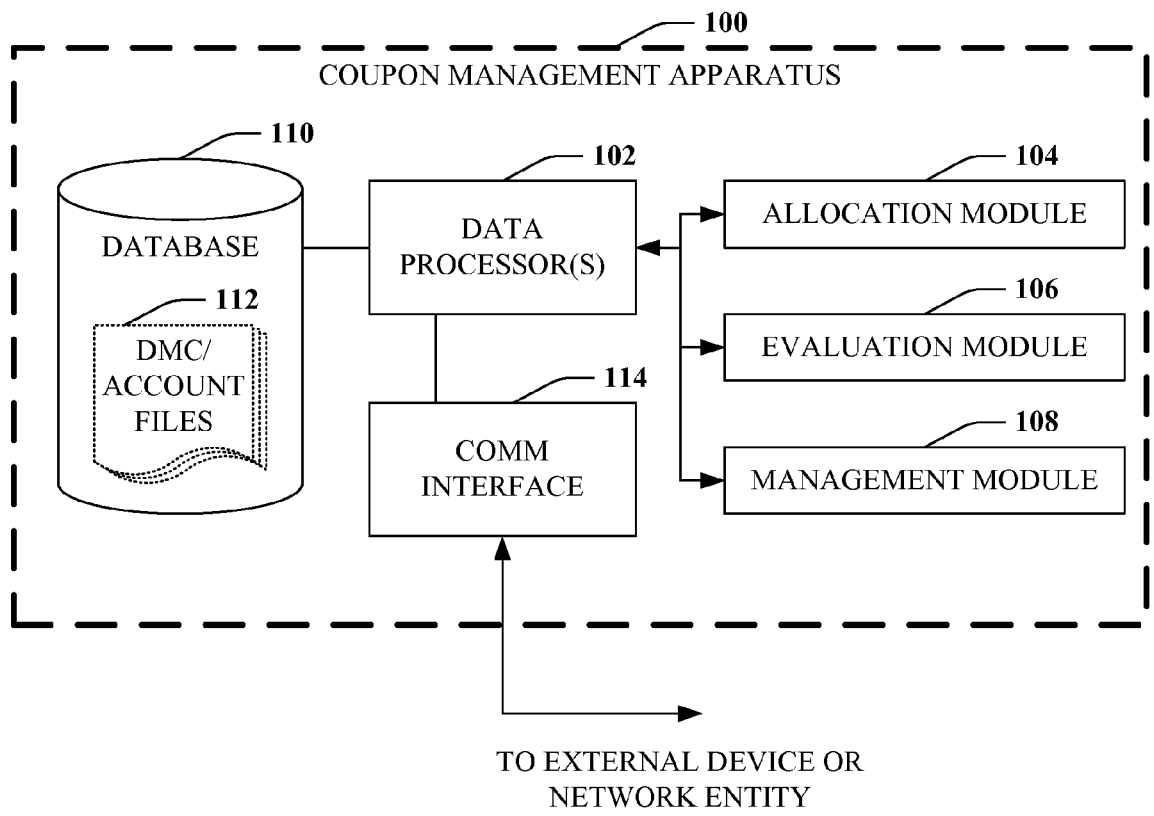
FIG. 1 illustrates a block diagram of an example apparatus for managing dynamic mobile coupons (DMCs) in a mobile communication environment, according to one aspect.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems, and apparatuses described herein are described in the context of providing efficient implementation and utilization of dynamic mobile coupons in wireless communication environment. One skilled in the art should appreciate that similar techniques could apply to other communication environments.

In some aspects of the subject disclosure, a server-side mechanism for managing dynamic mobile coupons in mobile device-related transactions is provided. Historically speaking, a coupon is generally a certificate or note, torn off from a ticket, advertisement, or the like, that entitles a bearer of the coupon to a specified benefit. A sponsor of the coupon agrees to provide the benefit in exchange for an action taken by the bearer of the coupon; typically in conjunction with the bearer engaging in a commercial transaction with the sponsor, such as purchase of a product or service provided by the sponsor.

For mobile devices, coupons can take the form of electronic applications, also referred to as mobile coupons or electronic coupons. These mobile coupons can include multimedia files that employ user interface features of a mobile device to convey coupon-related information. As an example, a mobile coupon can play an audio recording that announces coupon-related information, display pictures, text, or other video media descriptive of such information, employ various sensory features of the mobile device to display product or sponsor information (e.g., tactile interface, olfactory spray features), and so forth. Additionally, the mobile coupon can include or be coupled with media files that can play audio/visual advertisements related to the coupon (e.g., product/service advertisement), coupon sponsor (e.g., sponsor advertisement) or to a third party related to the sponsor (e.g., third party advertisement).

Additionally, because the mobile coupon is an electronic application, attributes of the coupon, benefits provided by the coupon or transactions involving the coupon can be personalized for a particular user or have non-fixed, variable characteristics. These characteristics can be subject to various data or conditions pertinent to a mobile coupon sponsor, a transaction related to the coupon, a user, or user account associated with the mobile coupon, a mobile device employed by the user or coupled with the user account, actions taken by the user involving the mobile device or user account, and so on. A set of rules can correlate states of the dynamic characteristics to predetermined data or conditions. Based on current conditions or data, current characteristics can be determined and applied to the mobile coupon, yielding a current value or state of the mobile coupon. Thus, as an example, a transaction price or discount value can depend on a time of day, for instance, or day of the week. Thus, on various days or at various times the price of a good or service, or discounted price benefit, can change. According to this example, the current value or state of the mobile coupon depends on the day of the week or the time of the day. It should be appreciated that various other value/state dependencies can be established to cause current DMC characteristics to vary as a function of selected conditions or data.

As another example, an attribute of the mobile coupon can be personalized for a particular user, or for a particular user account. For instance, a media application associated with the mobile coupon could display user receipt, redemption, or sharing history pertinent to a user account. Alternatively, the media application could display or highlight members of a user's friends list, social network, etc. who also have the mobile coupon assigned to their respective accounts. As another alternative, the media application can display or announce the user's name, access user coupon preferences, display coupon-related status activity for members of the user's social network, and so forth. It should be appreciated that other suitable examples of personalized coupon attributes or characteristics are contemplated as part of the subject disclosure; the scope of the disclosure is not limited to the articulated examples. Furthermore, as utilized in this disclosure and appended claims, a mobile coupon having a variable characteristic (e.g., changing based on some criteria, or state of data) or an attribute personalized for a particular user or user account is defined as a dynamic mobile coupon (DMC).

Further to the above, DMCs can be distributed by a coupon sponsor, or a third party distribution entity to a user account. Distribution can be as described in U.S. application Ser. No. 12/142,159 entitled Dynamic Electronic Coupon for a Mobile Environment, or in U.S. application Ser. No. 12/142,597 entitled Management of Dynamic Electronic Coupons, each of which are incorporated by reference in their entireties herein, or as described herein. As one particular example, a network server can be employed to transmit a DMC to an account server that manages a DMC account associated with a mobile device. As another example, a mobile network component can employ a terrestrial radio network to send the DMC directly to the mobile device over-the-air. As yet another example, a wireless transceiver can be employed (e.g., by a computer, independent server, point of sale device, distribution device, etc.) to send the DMC directly to the mobile device. In still other examples, the DMC can be downloaded from the Internet, loaded on a memory card or Flash card or drive, and installed manually on the mobile device, pre-loaded onto a subscriber identity module (SIM) or removable user identity module (RUIM), or the like.

For direct transmission to the mobile device, a mobile application residing on the device can receive the DMC and display the DMC (e.g., including related media files/applications or advertisement files/applications) to a device user. The mobile application can be substantially as that described in U.S. application Ser. No. 12/142,159, cited above. For network transmission to a network account, the account server can relay the DMC to the mobile device, or the account server can provide remote access, remote management, remote trading (e.g., with peer mobile devices) or remote redemption of the DMC via a network Browser, or other network-based application (e.g., in lieu of or in addition to a mobile application on the mobile device). In the latter case, a DMC can be delivered to or accessed (e.g., browsed, printed, shared etc.) from various mobile devices associated with a DMC user account, including a cellular phone or smart phone, personal digital assistant, e-book reader, digital photo frame, computer, laptop, and so on.

Further to the above, DMCs can be distributed individually, or in bundles or packages by a particular coupon sponsor, distributor or re-distributor. For instance, a sponsor can establish a set of DMCs (e.g., a DMC 'booklet') pertaining to products or services of the sponsor, and offer the set of DMCs for sale (e.g., an offer might comprise $50 for $200 face value coupons) or as part of another suitable promotion. As another example, a coupon distributor could bundle sets of coupons provided by different sponsors as a single package of coupons. Upon purchase or other payment/service agreement, the package of coupons can be transferred to a user account/user mobile device. In yet another example, a re-distributor could break up DMC sets or packages obtained from a sponsor or distributor, and offer a DMC book comprising an arrangement of DMCs from the sets/packages selected by the re-distributor. Regardless of how DMCs are arranged or by what entity, once a DMC set/package/book is purchased or otherwise obtained, it can be distributed to a user account or mobile device in a similar manner as discussed above.

According to some aspects of the subject disclosure, data and conditions affecting value or state of a DMC can be uploaded to a network processing module for evaluation. The processing module can manage a current state of the DMC by analyzing the data/conditions and comparing the analysis to rules establishing DMC characteristic states. Based on the comparison, a current state of the DMC is obtained. Data and conditions can be monitored by network entities, retail entities, or mobile devices, depending on the particular condition/data, and uploaded to the network processing module. As numbers of DMCs managed by the network processing module increase, however, processing load can become prohibitive, potentially reducing processing or memory resources for other network applications (e.g., redemption of DMCs, assignment of DMCs to mobile devices, etc.). Processing load can be exacerbated where complex relationships between user account status and current DMC state exist, particularly where significant delay occurs in providing the network processing module with data necessary to analyze the current DMC state.

Some aspects of the subject disclosure relate to addressing the foregoing problem. For example, DMCs can be associated with a dynamic/fixed flag utilized by the network processing module to terminate data analysis involved in evaluating varying DMC states. When processing load exceeds a threshold level, one or more DMCs managed by the module can be set to fixed, allowing the processing module to forego analysis pertaining to such DMCs. Processor or memory resources freed up in this manner can be allocated to other processing/storage tasks.

Where a DMC is set to fixed, variable characteristics of the DMC are frozen, or non-dynamic. Accordingly, the current state of the DMC becomes static, rendering the DMC a non-dynamic mobile coupon, (e.g., at least until the dynamic/fixed flag is set to dynamic, and further state processing for dynamic characteristics of the DMC is implemented). The static state of the DMC can be temporary or permanent, depending on programming logic governing the network processor. Further to the above, the DMC characteristics or state can be set to a default state/value when the dynamic/fixed flag is set to fixed. The default state can comprise a predetermined state (e.g., a predetermined monetary discount), or can comprise a most recent state determined by the network processor (e.g., the discount value most recently established for the DMC).

Where suitable, the network processor can change the dynamic/fixed flag of one or more DMCs from static to dynamic. Such can occur after a threshold time, once processing load drops below a threshold level, based on a request from a mobile device associated with the DMC (e.g., via a DMC user account), based on a request from a DMC sponsor, or the like, or a combination thereof. Once the flag is set to dynamic, the network processor again analyzes uploaded data to determine a current state of variable characteristics of the DMC. Such characteristics are downloaded to the mobile device (e.g., via a wireless network) for display to a user. Accordingly, the user can be informed of state changes to one or more DMCs, allowing the user to make redemption decisions based on the current DMC state.

According to further aspects of the subject disclosure, benefits provided by a DMC can be based on activity occurring after redemption of the DMC, in lieu of or in addition to benefits provided at the time of redemption. Thus, for instance, if a copy of a DMC is shared from one user account to recipient user accounts, or a copy(ies) of the DMC is redeemed by a recipient user account(s), a benefit can be provided to the sharing account. As another example, a benefit involving multiple-items can be applied to non-concurrent transactions for the respective items. As a particular case to illustrate the foregoing, a DMC can provide a mobile device user account with a one-dollar discount if redeemed with purchase of item A, a three dollar discount if redeemed with purchase of item B, and a five dollar discount based on purchase of both items A and B. If the DMC is redeemed in conjunction with a purchase of item A involving the mobile device, the transaction involving item A is reduced by one dollar. However, if a user employs the mobile device in purchasing item B after redemption of the DMC, a four dollar discount benefit can be provided. The benefit can be realized by applying the four dollar discount to the purchase of item B, by depositing four dollars in a financial account associated with the mobile device user account (e.g., a bank savings account, checking account, money market account, investment account, and so forth), by sending a rebate check for four dollars to an address associated with the user account, and so on. According to such aspects of the subject disclosure, DMC benefits can be applied to a richer and more diverse set of transactions, increasing utility of the DMC in mobile-related commerce.

In at least one additional aspect of the subject disclosure, DMCs can be employed in providing an enhanced mobile-related shopping experience. A mobile device can communicatively couple with a commercial entity (e.g., wireless network of a retail store) and share information with the commercial entity to implement the enhanced shopping experience. In some aspects of the subject disclosure, the mobile device can provide an identifier (ID) of a DMC user account associated with a mobile device user to the commercial entity. The commercial entity can forward the ID to a back-end DMC management apparatus that maintains DMCs associated with the user account. A correlation between products/services of the commercial entity and DMCs of the user account can be identified (e.g., by comparing product name, product ID, product serial number, etc., specified on an associated DMC), and a benefits) provided by the DMCs can be applied to suitable products/services. A list of products/services of the commercial entity can be compiled, reflecting the benefits provided by DMCs associated with the user account, and optionally detailing those benefits (e.g., differences in cost, money saved, additional product availability, extension of service or contract terms, and so forth).

Also based on the communication between the commercial entity and mobile device, a list of products/services of the entity can be displayed for virtual shopping on the mobile device. Alternatively, or in addition, products/services can be wirelessly scanned by the mobile device to provide data pertaining to the product/service to such device (e.g., via near-field wireless communications, optical scanning input, Bluetooth® communications, or the like). Once the mobile device obtains a product/service of the commercial entity, data or media descriptive of the item can be output to a user. In addition, the data/media can specify or highlight modified transaction information involving the item, as a result of applying pertinent DMC benefits to the item. A user can be given the option to select an output item, where the selection is received as input to the mobile device. The user can also specify whether applicable DMCs should be redeemed with the product. The selected item and DMC(s) can then be uploaded to the commercial entity, or to a network entity (e.g., via wireless data exchange) configured for managing DMCs or mobile-related commerce. A virtual invoice for the item is generated, which includes the benefits provided by the selected DMCs. Optionally, the invoice can also reflect other benefits from other user accounts associated with a user of the mobile device, such as a user loyalty account, frequent-customer account (e.g., frequent shopper, frequent purchaser, frequent flyer, frequent guest, and so on), credit card reward points, etc.

Once the virtual invoice is generated, a transaction involving the invoiced items can be completed, causing redemption of specified DMCs. The transaction can be completed virtually by entering payment information into the mobile device, and submitting the payment information to the network entity or commercial entity. Reconciliation of DMC or other user account benefits can be implemented between the network entity and commercial entity, based on the invoiced items and payment. A receipt of the invoice and transaction can be provided to the commercial entity and mobile device for physical item checkout (e.g., a user or store employee can scan items in their shopping cart to reconcile the transaction with shopping cart items). As another example of completing the transaction, the virtual invoice can be provided to the point of sale device, which can display verification of payment and a list of items involved in the transaction. The point of sale device or a store employee can reference items that the user has in their possession or shopping cart with the list of items, by automated scanning or human inspection, respectively.

In at least one further aspect of the subject disclosure, enhanced mobile-related shopping can further comprise virtual in-store mapping at the mobile device. For instance, data exchange between the mobile device and commercial entity can involve transfer of a virtual mapping application, depicting a layout of the store for display at a mobile device. According to some aspects, a position location of the mobile device can be highlighted on the map, determined from global positioning system (GPS), cellular base-station position determination, satellite-position determination, wireless communication with a set of wireless transceivers of the commercial entity, and so on.

Further to the above, position location of select items can also be displayed on the mapping application. Selection of items can be based on explicit selection at the mobile device, or inferred selection. The latter, for instance, can include items associated with a DMC in a mobile device user account, items the user has purchased in the past, items the user has indicated an interest in, etc. Once position location of select items is displayed on the map, a route between the user's position location (e.g., inferred from position location of the mobile device) can be displayed on the mapping application, helping the user navigate through the store via the mobile device display. In some aspects of the subject disclosure, routes can be displayed between the user and each selected item, between the user and items explicitly selected by the user, and so on. Routes to different items can be visually distinct, highlighted upon selection, hidden upon selection of a different item, etc., to increase utility and user friendliness of the mapping application. When the mobile device comes within a threshold distance of a selected item, user interface feedback can be implemented to announce the proximity to a selected item. Such feedback can include a particular graphical highlighting on the mapping application, execution of an audio-video application pertaining to the item, auditory or verbal announcement of the item, vibration of the mobile device, or the like, or a combination thereof Once in proximity to the item, the user can select the item as described above (e.g., optical scanning, selection on mobile device UI display), causing the mobile device to submit the item for virtual invoicing. Accordingly, a rich and robust integration between virtual commerce and physical shopping can be implemented by the subject disclosure, based on properties of DMCs and associated mobile device user accounts and mobile devices.

In at least one aspect of the subject disclosure, electronic video or graphical recognition systems can be employed to filter DMCs associated with a particular DMC sponsor. For instance, a picture of a trademark, logo, building, etc., of a sponsor, that contains graphics or imagery distinctive of the sponsor can be recognized and utilized to automatically search or retrieve DMCs associated with the sponsor. In other aspect, sounds, audio files, music, jingles, etc., distinctive of the sponsor can be recognized with electronic audio recognition and utilized to search for DMCs associated with the sponsor. It should be appreciated that recognition can be implemented at a mobile device, or at a network entity based on information (e.g., photographs, media files, audio recordings, video recordings, etc.) uploaded to the network entity.

In other aspects of the subject disclosure, if a DMC is retrieved, activated, or searched on an electronic user device, a system can also search for and retrieve retail outlet locations or virtual website locations that honor a benefit provided by the DMC. The outlet/website locations can be associated with a sponsor of the DMC, a related partner of the sponsor, or a DMC distributor, re-distributor, or the like. Furthermore, for physical retail locations, a navigation application can be initiated to provide travel/driving directions to nearby locations, estimate distance from user location, time of arrival, and so on. For online retail locations, a list of such locations can be displayed with links to pertinent websites, etc., for retail entities that honor the DMC in electronic transactions. It should be appreciated that the subject disclosure is not limited in scope to the specific examples articulated herein, however. Rather, other examples and embodiments of the subject disclosure, known to one of skill in the art or reasonably made known to one of skill in the art by way of the context provided herein, are considered part of the subject disclosure.

Referring now to the figures, FIG. 1 illustrates a block diagram of an example apparatus (100) providing DMC management according to one or more aspects of the subject disclosure. Specifically, depicted is a coupon management apparatus 100 providing network-assisted implementation of DMCs for mobile device-related commerce. Apparatus 100 can facilitate assignment of DMCs to user DMC accounts, tracking status of such DMCs, establishment of current states of variable characteristics of the DMCs, and redemption of the DMCs in conjunction with specified transactions. As one example, apparatus 100 comprises a component of a network (e.g., a cellular network, data network) communicatively coupled, either directly or indirectly (e.g., by way of another network or series of networks) with a mobile device associated with a DMC user account. However, the subject description and claims are not so limited.

Coupon management apparatus 100 can comprise a set of data processors 102 for executing one or more modules stored in memory (not depicted) pertinent to functions provided by apparatus 100. Data processor(s) 102 can comprise any suitable set of hardware or hardware and software processing components. The modules can include an allocation module 104 for assigning a DMC to a DMC user account coupled with a mobile device (mobile device user account). The assignment can be based on criteria specified by a sponsor of the DMC, stored in a database 110. Once a mobile device user account is identified, the DMC or a suitable indication thereof (e.g., a distinct ID) is conveyed to the DMC user account via a communication interface 114.

It should be appreciated that in some aspects of the subject disclosure communication interface 114 can comprise a wireless transmitter that sends the DMC or indication thereof over-the-air to the mobile device. In other aspects of the subject disclosure, communication interface 114 can comprise a wired transmitter that forwards the DMC/indication to a suitable wireless network for transmission to the mobile device. In at least one aspect of the subject disclosure, communication interface 114 can send the DMC/indication to a non-mobile account of a user of the mobile device (e.g., an e-mail account) via one or more network servers sponsoring the non-mobile account. In such aspects, the user can load or access the DMC via a direct communication link (e.g., an Ethernet cable) or through a web browser, for instance.

Criteria for identifying a suitable mobile device user account can include identity of a user associated with the mobile device user account, previous account activity associated with such user account (e.g., redemption of DMCs, account-related transactions, online shopping, inter-user DMC sharing, executing or reviewing an advertisement of the sponsor or a related third party, or the like), status of a receive/deny DMC distribution flag of the user account, a determinable circumstance pertaining to a mobile device associated with the user account (e.g., position location of the mobile device, proximity of such device with apparatus 100 or a wireless transmitter 114 of apparatus 100, proximity to a retail location pertinent to the DMC or DMC sponsor, etc.), or the like, or a suitable combination thereof Other criteria for assigning a DMC to a mobile device user account can be employed by allocation module 104, such as those criteria described in U.S. patent application Ser. No. 12/142,159 entitled Dynamic Electronic Coupon for a Mobile Environment, or in U.S. patent application Ser. No. 12/142,597 entitled Management of Dynamic Electronic Coupons, each of which are expressly incorporated by reference herein.

Further to the above, coupon management apparatus 100 can comprise an evaluation module 106. The evaluation module 106 can establish an initial state for one or more variable characteristics of a DMC. The initial state can be a function of various determinable data or conditions. Example conditions can include activity pertaining to the mobile device user account, promotional offers provided by a sponsor of the DMC, product inventory status, time of day, day of the week, season, position location of a target mobile device, or the like, or a suitable combination thereof Data characterizing the determinable conditions can be uploaded to apparatus 100 via communication interface 114, and stored in database 110. A set of characterization rules 112 stored in the database 110 can be employed by evaluation module 106 for analyzing the uploaded data and determining the initial state, as well as subsequent states of the variable characteristics. Based on the analysis, evaluation module 106 can output a current state for the DMC, which can define benefits provided by the DMC in conjunction with a commercial transaction (e.g., purchase, rent, lease, etc. of a product or service).

Evaluation module 106 can trigger determination of the current state of the DMC in at least one predetermined manner. For instance, the determination can be made periodically, based on a time-based function saved in database 110. Alternatively, the determination can be non-periodic, based on a non-time based function. As another example, evaluation module 106 can trigger the current state determination in response to input from a mobile device user account or DMC sponsor, or the like. Evaluation module 106 can further employ suitable combinations of the foregoing trigger mechanisms, or like trigger mechanisms in determining the current state of the DMC.

In addition to the foregoing, coupon management apparatus 100 can comprise a management module 108 for managing respective states of a set of DMCs issued by apparatus 100, or otherwise maintained by apparatus 100. Specifically, the management module 108 can maintain a status of respective DMCs in database 110. The status can comprise a current state of a DMC and associated benefits determined by evaluation module 108. Additionally, the status can comprise a fixed/dynamic state of the DMC, which specifies whether characteristics of the DMC are variable or constant. In at least one aspect of the subject disclosure, the status can comprise a redemption state, establishing whether the DMC has been selected for redemption in conjunction with a specified product or service pertinent to the DMC. The redemption state can further specify whether the DMC has already been redeemed or is outstanding. Further to the above, the status can include a post-transaction flag indicating whether activity occurring after redemption of the DMC is pertinent to a benefit provided by the DMC. Thus, based on the status of the DMC, apparatus 100 can determine whether the DMC is outstanding or redeemed, dynamic or fixed, what benefits are currently associated with the DMC, whether the DMC is selected for redemption in conjunction with an identified transaction, or whether outstanding benefits can accrue to a user's account based on post-transaction activity related to the DMC. It should be appreciated, however, that the foregoing status and determinations are exemplary only, and apparatus 100 is not so limited to the specifically recited examples.

Figure 2:
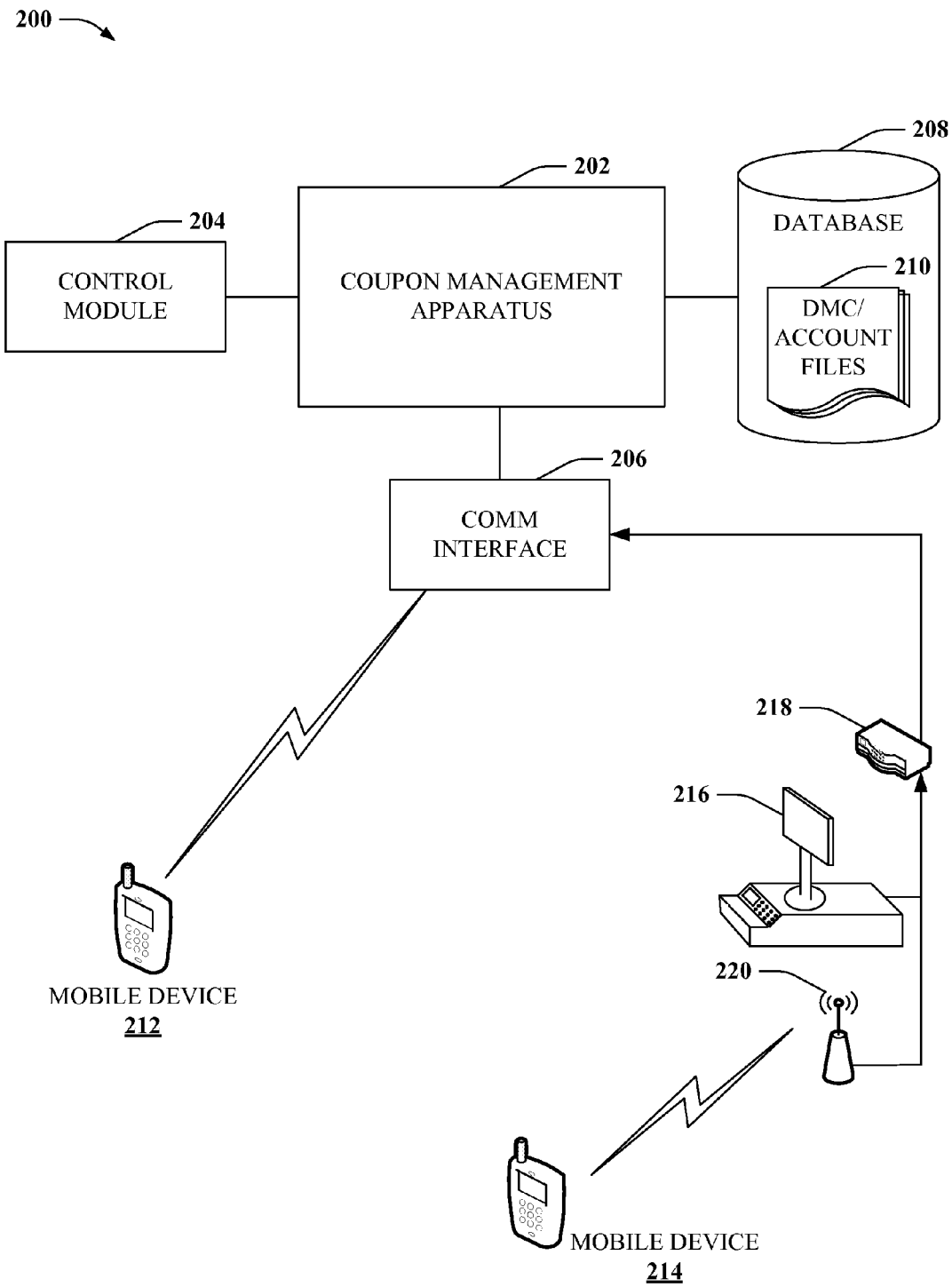
FIG. 2 depicts a block diagram of a sample system for mitigating network loading based on maintaining DMC variability characteristics, according to one aspect.

FIG. 2 depicts a block diagram of an example system 200 for mitigating processing load involved in maintaining status of DMCs according to additional aspects of the subject disclosure. System 200 comprises a coupon management apparatus 202 that can be employed to manage DMCs utilized in mobile device-related commerce. Management can include assigning a DMC to a mobile device user account, or receiving and monitoring data pertinent to variable characteristics of the DMC (variable characteristics can include, e.g., commercial benefits, transactions related to such benefits, products/services involved in such transactions, logistics related to completing the transactions, or the like). Furthermore, management can include establishing an initial state of such variable characteristics, monitoring changes in the pertinent data and updating current states of the variable characteristics, applying DMC benefits to commercial transactions, updating a user account (e.g., DMC account, bank account, credit account, investment account, etc.) to reflect a DMC benefit, and so on.

Additionally, system 200 can comprise a control module 204 that evaluates processing load of the coupon management apparatus 202. Specifically, control module 204 can track processor, memory or other related resources relative to one or more resource consumption thresholds. Control module 204 can further determine if consumption of a resource exceeds or falls below a threshold resource consumption threshold. If control module 204 determines that resource consumption exceeds a threshold, control module 204 can suspend consumption of the resource (e.g., a processing resource). In some aspects of the subject disclosure, processing can be suspended by setting a dynamic/fixed flag associated with one or more DMCs to a fixed state, rendering the DMC non-variable. Accordingly, coupon management apparatus 202 can forego evaluating data pertinent to the fixed DMCs, and conserve or re-allocate resources otherwise allocated to the evaluation.

Furthermore, control module 204 can determine whether resource consumption falls below the resource consumption threshold, or a second resource consumption threshold associated with re-starting data and state evaluation for fixed DMCs. In such case, control module 204 can set a dynamic/fixed flag of one or more fixed DMCs to dynamic. Accordingly, coupon management apparatus 202 can re-initiate variable characteristic evaluation of the DMCs, and establish current DMC states based on current data, and vary such state based on changes in the data.

DMC states and DMC dynamic/fixed flags can be stored in a DMC account file 210, associated with a DMC user account, maintained by a database 208. Additionally, data pertinent to variable characteristics of the DMC can be stored in the DMC account file 210, and updated as changes to the data occur. Moreover, changes to the DMC state based on the changes to the data can also be saved in the DMC account file 210. Coupon management apparatus 202 can employ a communication interface 206 to convey DMC state information to a mobile device associated with the DMC user account. Alternatively, or in addition, coupon management apparatus 202 can convey DMC state information, as well as other pertinent information (e.g., DMC transaction information, fixed/dynamic information, redemption information, DMC benefits, applicable transactions and products/services, a default state and associated default benefits) for the DMC while fixed, and so forth) to a point of sale device 216 via a router module 218 coupled with the point of sale device 216.

Data pertinent to determining a current state of a DMC can be uploaded to the coupon management apparatus 202 from a mobile device 212, 214, a point of sale device 216 wirelessly coupled with a mobile device 204 (e.g., by a wireless transceiver 220), or other suitable communication node or network entity (e.g., a computer associated with a retail store or other commercial entity). To this end, communication interface 206 can be configured to communicate wirelessly, or via wired data exchange. Thus, communication interface 206 could comprise a wireless transceiver and antenna, a wired router, switch or hub, or a suitable combination thereof.

In at least some aspects of the subject disclosure, data exchange directly between mobile device 212 and mobile device 214 (e.g., via peer-to-peer communication) can be used as a basis for determining variable characteristics of a DMC. As one example, peer-to-peer communication between the mobile devices 212, 214 can involve sharing a copy of the DMC from a user account associated with a first mobile device (212) to a user account associated with a second mobile device (214). The sharing can, according to particular aspects, be conditioned on a setting of a DMC sharing flag associated with the DMC (e.g., establishing whether a copy of the DMC can be generated or shared with other user accounts, or establishing conditions for such sharing). In another example, data exchange between the mobile devices 212, 214 can involve a peer-to-peer transaction (e.g., sale, lease, rent, etc., of a product or service) between the devices 212, 214. In the latter example, details pertaining to the peer-to-peer transaction (e.g., product ID, price, DMC benefits, payment method, etc.) can be uploaded to the coupon management apparatus 202 for approval. Based on a set of rules for conducting peer-to-peer transactions (e.g., redemption rules for the DMC, product/service availability, suitable identification of the product/service, verification of payment, proof of transfer—which can include scanning an ID of a product first by a selling device 214 and second by a buying device 212—or the like), coupon management apparatus 202 can approve or deny the peer-to-peer transaction. Accordingly, coupon management apparatus 202 can act as an arbiter for peer-to-peer as well as retail or commercial transactions.

Figure 3:
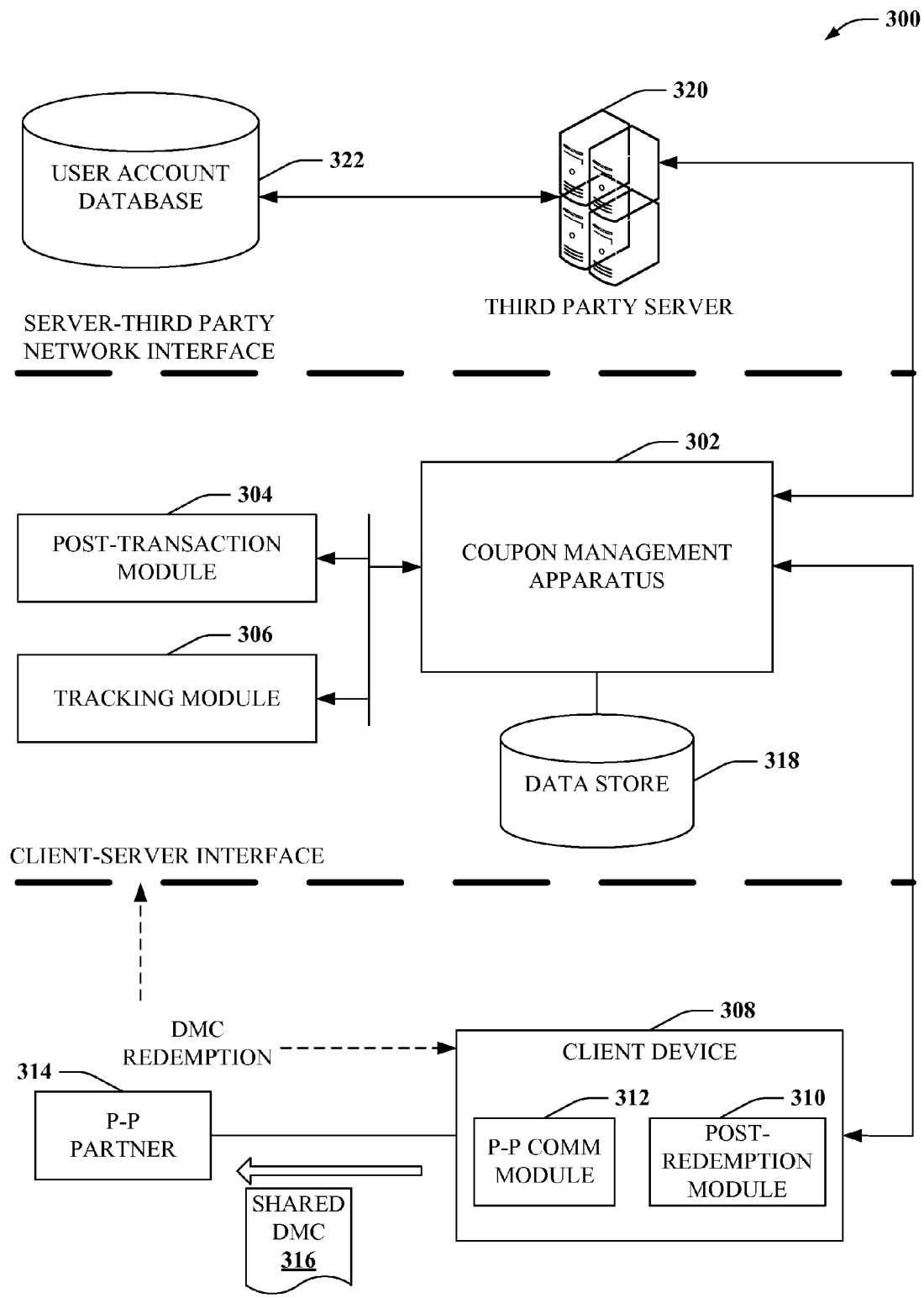
FIG. 3 illustrates a block diagram of an example system for implementing post-transaction activities for DMCs according to one or more disclosed aspects.

FIG. 3 illustrates a block diagram of an example system 300 for providing post-transaction or post-redemption aspects for mobile-related commerce, according to one aspect. The system 300 can comprise a coupon management apparatus 302 for managing DMCs and DMC state as described herein. Additionally, system 300 can comprise a post-transaction module 304 coupled with coupon management apparatus 302. The post-transaction module 304 can be employed to communicate with a third party server 320 (e.g., banking server, etc.) and update an account (322) associated with a user of a client mobile device 308. Updating the account (322) can involve granting a post-redemption benefit based on activity occurring after redemption of a DMC.

Account (322) can comprise a DMC user account, a banking account (e.g., savings, checking, certificate of deposit, and so on), a credit account, a debit account, an investment account, or the like, stored in a user account database 322 and associated with a user of client device 308. Updating the account is facilitated by the third party server 320 that manages the account (322). In some aspects, the account (322) can be updated with money or credit (e.g., transferred from an account associated with coupon management apparatus 302, or a sponsor of a DMC—not depicted) based on the activity occurring after redemption of the DMC. According to other aspects, updating the account can comprise assigning an additional DMC(s) based on such activity. The additional DMC(s) can comprise a copy of the redeemed DMC, a variation of the redeemed DMC(s) (e.g., having at least one different characteristic with respect to the redeemed DMC, such as a different benefit or product/service), or a disparate DMC or set of DMCs.

Whether and when to update the account (322), and in what manner to update the account (322), can be specified by a set of post-transaction rules employed by a tracking module 306 and stored in a data store 318. Based on such rules, tracking module 306 can identify suitable post-transaction activity pertinent to a DMC that confers a post-transaction benefit on a user of client device 308. The rules can contain a set of criteria identifying what condition(s) are required to be met to update the account (322) with a specific benefit (e.g., money, credit, DMC) based on post-redemption activity. An example of a post-redemption condition can include completing or advancing a multiple-product transaction specified by a DMC. For instance, the DMC may be redeemed in conjunction with a transaction involving a first of the multiple specified products. When subsequent products are transacted, progressive benefits can be conferred to the user account (322). As another example, a final benefit can be conferred to the user account (322) upon completing transactions involving all of the multiple specified products.

As another example, the post-redemption activity can involve sharing a copy of the DMC 316, or other related DMCs, among other mobile device user accounts 314. In this case, user sharing can be a feature of DMC 316. Client device 308 can employ a peer-to-peer communication module 312 to wirelessly couple with a peer-to-peer partner 314. If the sharing feature is enabled, a copy of a DMC (316) can be generated and sent to peer-to-peer partner 314. A DMC user account associated with a peer-to-peer partner 314 can acknowledge receipt of the shared DMC 316. The acknowledgement can be stored by a post-redemption module 310, and transmitted to coupon management apparatus 302 for tracking of qualified post-redemption activity conferring a post-redemption coupon benefit.

Optionally, exchange of the shared DMC 316 can be limited to authorized user accounts (e.g., accounts associated with family members, social network members, co-workers, organization members, etc.). As a further option, updating the account (322) with a post-redemption benefit based on DMC sharing can be conditioned on redemption of the shared DMC 316 by a recipient user account (e.g., peer-to-peer partner 314). In such case, evidence of the redemption (e.g., a transaction ID, DMC ID, redemption acknowledgement provided by coupon management apparatus 302) can be conveyed to client device 308 and stored at post-redemption module 310. Alternatively, peer-to-peer partner 314 can upload an ID of the client device user account (308) to coupon management apparatus 302. Coupon management apparatus 302 can then employ post-transaction module 304 to credit the recipient account redemption to client device 308.

In yet another example of post-redemption conditions, a suitable condition conferring a post-redemption benefit can comprise playing an advertisement of a DMC sponsor on the client device 308. Alternatively, the condition can comprise playing an advertisement of a related third party promoted by the DMC sponsor. In another alternative, the condition can comprise sharing the advertisement with another mobile device 314, which plays the advertisement. In the latter case, an advertisement acknowledgement obtained by playing the advertisement can be conveyed by the recipient mobile device 314 to the client device 308. Post-redemption module 308 can upload the acknowledgement to coupon management apparatus 302 to obtain credit for the shared advertisement, as described above.

Figure 4:
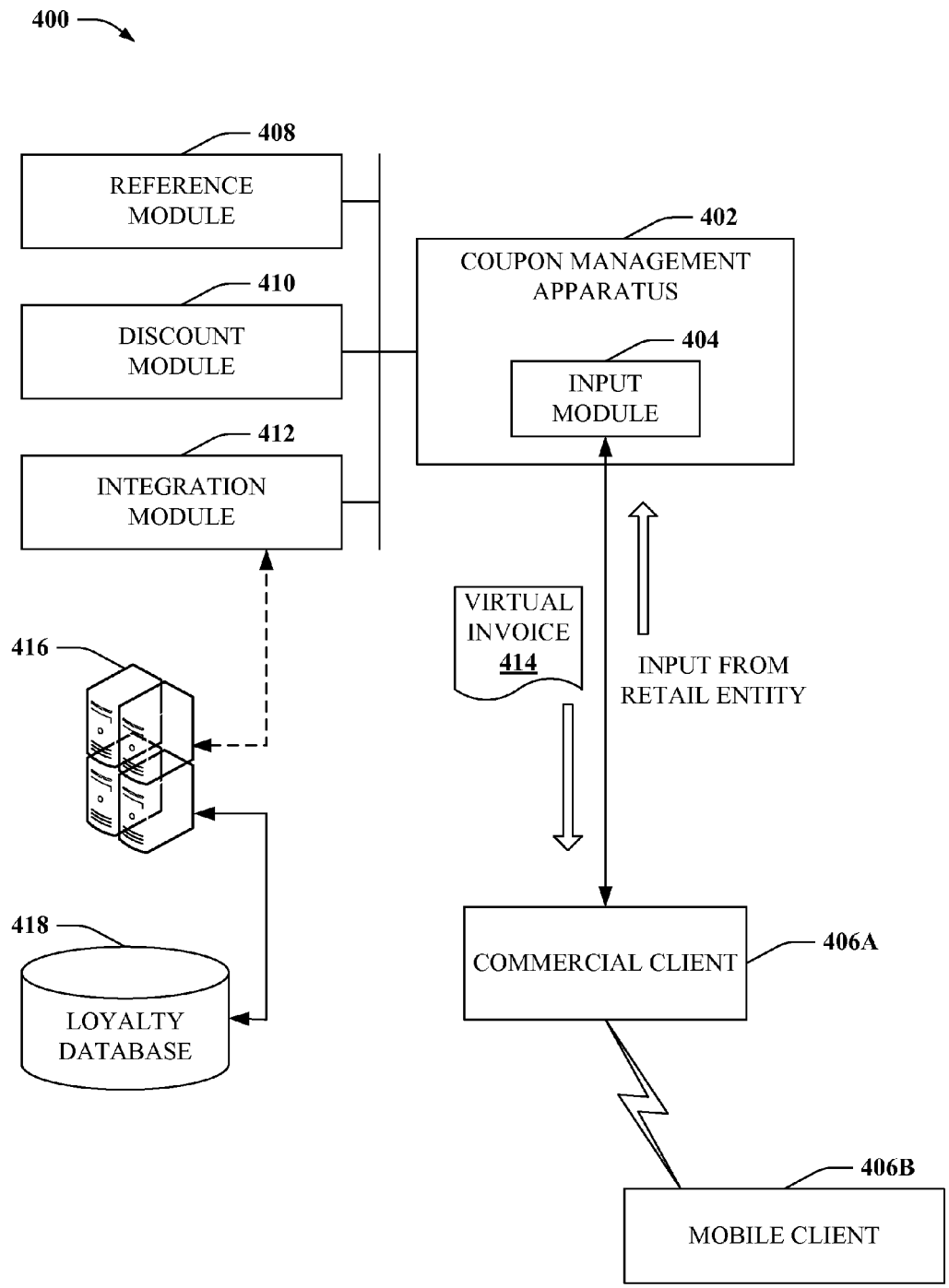
FIG. 4 depicts a block diagram of a sample system for providing a virtual invoice for mobile shopping according to one or more aspects of the subject disclosure.

FIG. 4 illustrates a block diagram of an example system 400 that provides enhanced shopping for mobile-related commerce according to particular aspects of the subject disclosure. System 400 can comprise a coupon management apparatus 402 for managing DMCs issued to one or more mobile device user accounts (e.g., associated with a client device 406B). Coupon management apparatus 402 can be substantially similar to coupon management apparatus 102, described at FIG. 1, supra.

In addition to the foregoing, system 400 can comprise a client device 406A associated with a commercial entity (e.g., a retail store, online store, investment bank, and so on) that submits information to the coupon management apparatus 402 via an input module 404. The information can include data pertinent to variable characteristic(s) of a DMC(s) assigned to a mobile client device 406B. Such pertinent data can include position location of the client device 406B, whether an advertisement of a DMC sponsor or related third party is viewed at the client device 406B, peer-to-peer sharing or shared redemption of DMCs, or the like, as described herein.

Further to the above, information provided by client device 406A can comprise mobile shopping-related information. In such case, client device 406A can comprise a point of sale device, or other processing device (computer) of a commercial entity (e.g., retail store). Communication between the coupon apparatus 402 and commercial client device 406A can be via a wired network connection (e.g., employing the Internet as a common network medium), or a wireless connection. Communication between the mobile client device 406B and coupon management apparatus 402 can be via wireless cellular communication, wireless fidelity (WiFi) communication, or other suitable wireless standard.

Information provided by a commercial entity client device 406A can comprise an ID of a DMC user account (406B) communicatively coupled with the client device 406A. Such communication can be initiated when the commercial client device 406A detects a suitable mobile device (406B) within wireless communication range. The client device 406A can request DMC user account information from the mobile device 406B. If received, the information is forwarded to coupon management apparatus 402 to initiate a DMC shopping session. Such session can exist while communication is maintained between the mobile client 406B, commercial client device 406A, and coupon management apparatus 402.

Coupon management apparatus 402 can be coupled with a reference module 408. Reference module 408 employs the DMC user account ID to look up active DMCs (optionally including redeemed DMCs providing post-redemption benefits) associated with the user account, and products/services specified by the active DMCs. A list of products associated with the commercial entity can be obtained from the client device 406A. Reference module 408 can then cross-reference products/services of the commercial entity with DMCs of the DMC user account. Benefits provided by applicable DMCs of the user account can be applied to associated products by a discount module 410. For instance, a discount benefit obtained by redeeming a DMC when purchasing a specified product can be applied to a purchase price of the specified product.

Reference module 408 then generates a list of products/services of the commercial entity affected by DMCs associated with the user account. The list comprises data identifying modified transaction characteristics (e.g., modified purchase price) resulting from application of DMC benefits to the products/services. The list is communicated to the commercial client device 406A, or directly to the mobile client 406B.

Further to the above, commercial client device 406A can obtain a product/service selection(s) from the mobile device 406B. The selection(s) can comprise an ID(s) of the selected products)/service(s), in conjunction with a 'buy' command, or 'place in virtual shopping cart' command, etc. The selected product/service ID(s) is forwarded to coupon management apparatus 402. The coupon apparatus 402 can generate a virtual invoice 414 for the selected products)/service(s), reflecting benefits provided by an applicable DMC associated with a selecting mobile device.

In some aspects of the subject disclosure, the virtual invoice 414 can also reflect benefits associated with additional commercial accounts of a user of the mobile client 406B. For instance, an integration module 512 can query the mobile client 406B for communication information (e.g., server ID and routing information) and access information (e.g., user login information) for a server 416 that manages a user account for the user. The server 416 and account can be a loyalty account of the commercial entity (e.g., providing frequent-shopper benefits), a credit or debit account of a bank or lending facility (e.g., providing frequent purchase rewards that can be applied to mobile-related transactions) or the like. Benefits associated with such account (e.g., price discounts) can also be applied to selected items included in the virtual invoice 414. Once generated, the virtual invoice 414 can be conveyed to the commercial client device 406A to facilitate payment for the products)/service(s), and completion of the transaction (including DMC benefits and optionally third party account benefits). Alternatively, or in addition, the virtual invoice 414 can be conveyed directly to the mobile client 406B via wireless communication, to facilitate completion of the transaction.

Mobile client device 406B can be associated with a DMC user account of a user of the mobile client 406B. Additionally, mobile client device 406B can submit an ID of the DMC user account directly to coupon management apparatus 402. Submission of the ID can be in response to an instruction from commercial client 406A (e.g., a wireless shopping assistant). Optionally, mobile device 406 can further submit an ID and routing information of the commercial client 406A to the coupon management apparatus 402, to facilitate a connection between the coupon management apparatus 402 and both the mobile client 406B and commercial client 406A.

Upon obtaining the ID from the mobile device 406, coupon management apparatus 402 can initiate a virtual shopping session for the mobile device 406. Product/service selections made by mobile client 406B can be conveyed to coupon apparatus 402 for virtual invoicing (414). As described above, the invoicing can update transaction information involving the selected product/service with benefits provided by a DMC associated with the DMC user account ID. A virtual invoice 414 comprising updated transaction information is sent to the commercial client 406A or mobile client 406B to facilitate the transaction, as described above. Based on the virtual invoice 414, mobile client 406B and commercial client 406A can exchange payment for invoiced items to complete the transaction.

Figure 5:
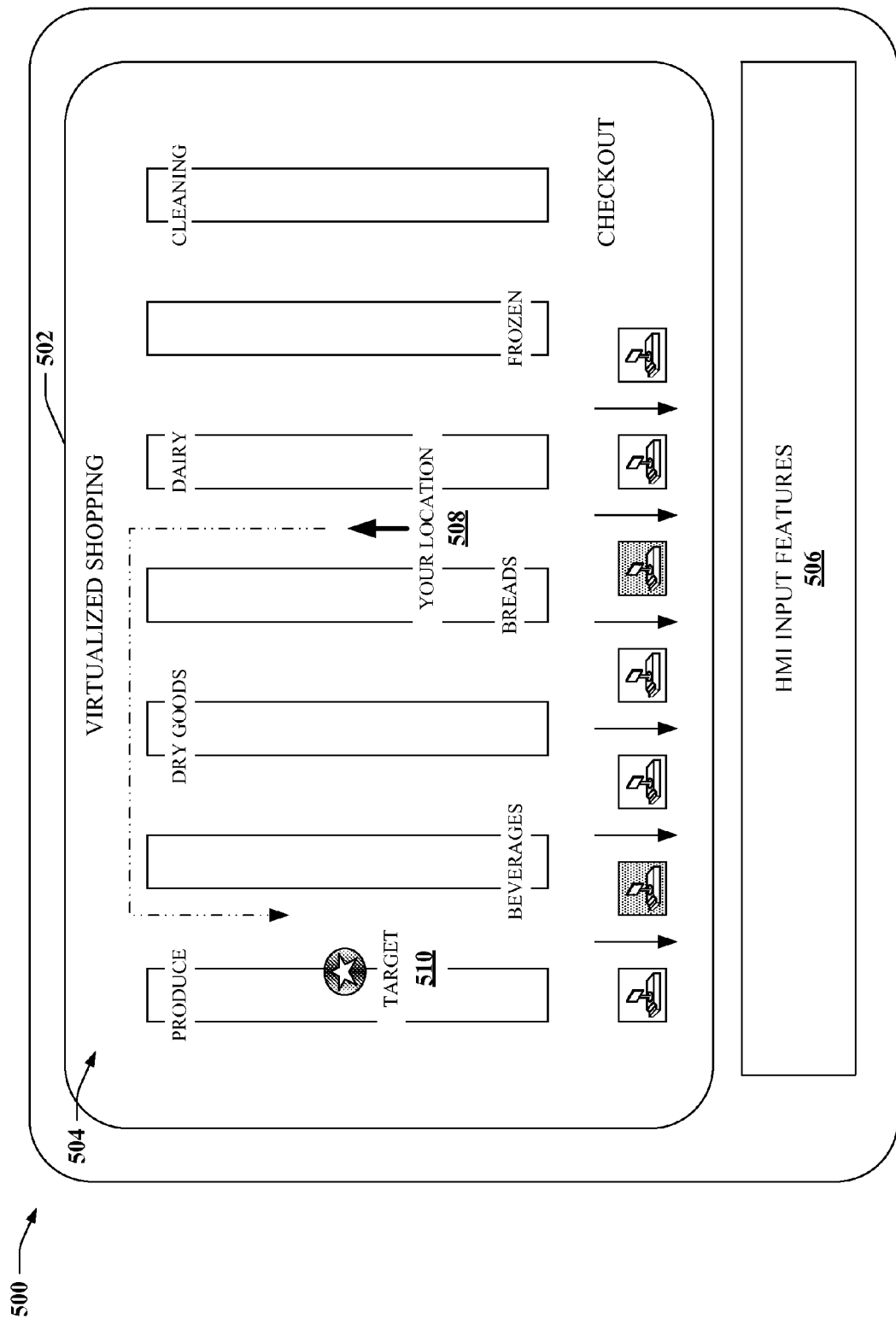
FIG. 5 illustrates a block diagram of an example electronic display interface to facilitate virtual shopping according to one or more aspects of the subject disclosure.

In conjunction with the virtual shopping session, the commercial client 406A can provide the mobile client 406B with a mapping application depicting a layout of a retail store associated with the commercial client 406A (e.g., see FIG. 5, infra). Location of selected items can be identified by commercial client 406A and provided to mobile client 406B for display on the mapping application. Additionally, mobile client 406B can display location of the mobile device on the mapping application, and depict convenient routes through the retail store layout to get to the selected items. To facilitate item selection, commercial client 406A can convey a list of products/services offered by an associated commercial store/entity, along with product/service descriptions and product/service IDs. As described above, the product/service descriptions can comprise benefits provided by applicable DMCs associated with a DMC user account of the mobile client 406B. In addition, the product/service description can include mapping position data for locating respective products/services on the layout of the retail store, where suitable.

FIG. 5 depicts a block diagram of an example mobile device 500 that can facilitate virtual shopping according to aspects of the subject disclosure. Mobile device 500 can comprise a user interface display 502, for outputting data or media to a user of the mobile device 500, or receiving input from the user. Input can also be facilitated by a set of human machine interface (HMI) features 506. HMI features 506 can include one or more buttons, knobs, controls, trackballs, or sliders facilitating data entry to mobile device 500, a touchscreen interface, a short range wireless receiver interface (e.g., for infrared or other suitable short range wireless data transmission), or other suitable user interface input features (506), of a mobile device 500, or combinations thereof.

In at least one aspect of the subject disclosure, mobile device 500 can obtain and execute a mapping application provided by a commercial entity. The mapping application can be employed to generate a shopping area layout 504 of a retail store associated with the commercial entity, and display the shopping area layout 504 at the user interface display 502 of the mobile device 500. The shopping area layout 504 can be annotated with descriptive information pertaining to store layout. Annotations can describe types or characteristics (e.g., type of product, such as food, beverage, cleaning, automotive, gardening, and so forth) of items in particular sections, aisles, etc., of the retail store. According to some aspects of the subject disclosure, the annotations can be customized by a user of the mobile device 500, based on user input at the display screen 502 or user interface input features 506.

According to some aspects of the subject disclosure, the mapping application can display a position location 508 of the mobile device 500 with respect to the store layout 504 on the display. The position location 508 can be determined from a GPS module (not depicted) located at the mobile device 500, cellular network positioning determination conveyed to the mobile device 500, satellite positioning determination conveyed to the mobile device 500, positioning determination conveyed by a set of wireless transceivers installed at the retail store, or the like. The position location 508 of the mobile device 500 can be updated on the layout 504 as position 508 of the mobile device 508 changes within the retail store.

In addition to the foregoing, mobile device 500 can obtain a list of items offered by the retail entity, e.g., via wireless communication with a communication device of such entity. The list of items can be displayed at the user interface display 502, optionally specifying coupon benefits that can be achieved by redeeming one or more DMCs associated with a user account of mobile device 500. A user can select one or more items in the list with the input features 506 or display 502. Position 510 within the retail store of selected items can be highlighted by the mapping application. Furthermore, a route between the mobile device location 508 and the selected item position 510 can be displayed on the layout 504 (dashed line between mobile location 508 and target 510) to facilitate user navigation of the retail store.

In at least some aspects of the subject disclosure, the mapping application can initiate a checkout module (not depicted) upon a checkout command input by a user of the mobile device 500. The checkout module can submit selected items to a wireless entity associated with the retail store for invoicing. Alternatively, or in addition, the checkout module can submit the selected items to a network coupon apparatus (e.g., coupon management apparatus 102 of FIG. 1) for virtual invoicing. Additionally, the checkout module can request checkout information for one or more point of sale locations (e.g., checkout register) of the retail store. Checkout registers having relatively few or no customers can be highlighted on the store layout 504, to facilitate efficient mobile-related shopping.

Figure 6:
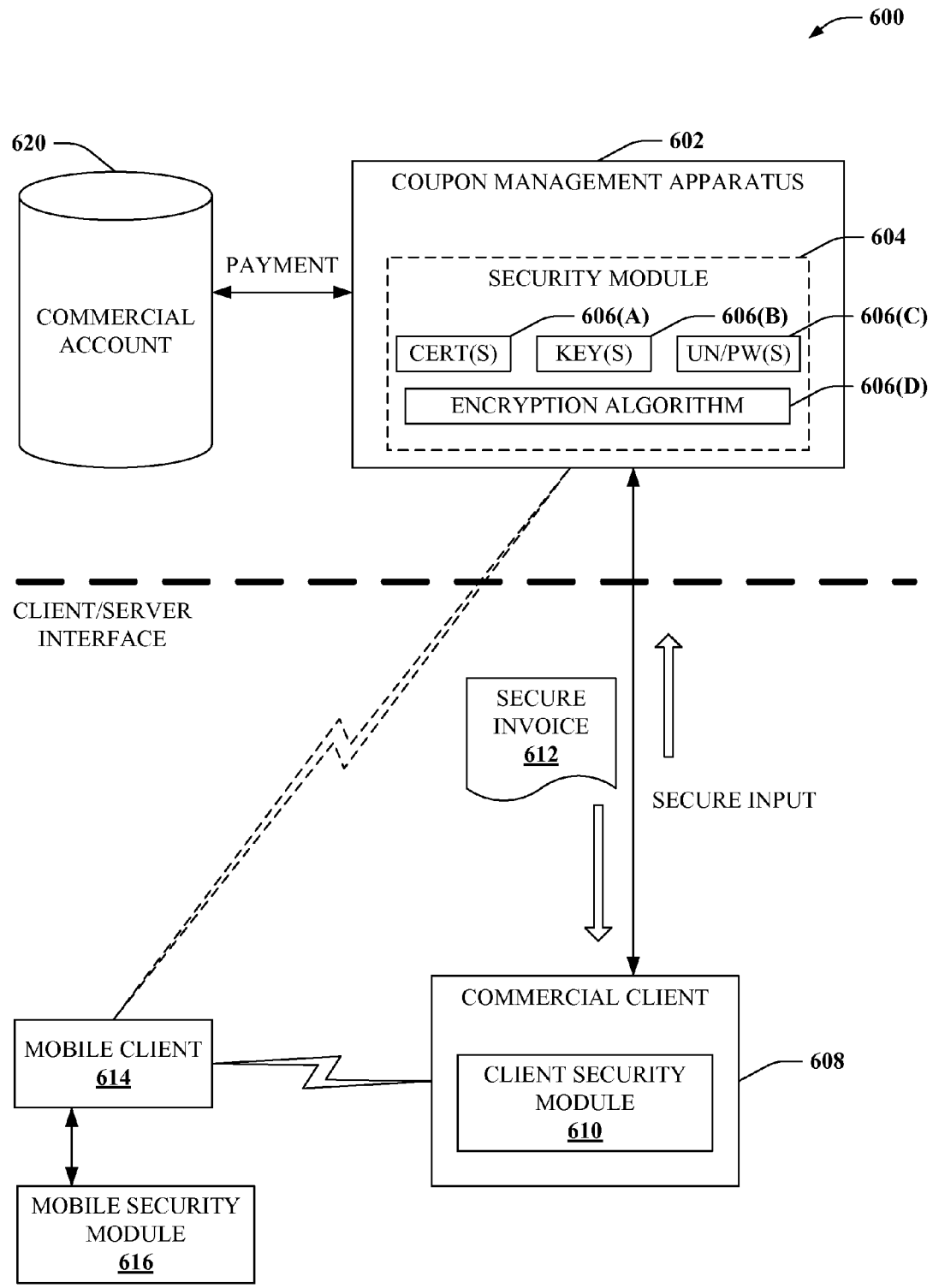
FIG. 6 illustrates a block diagram of a sample system providing security for electronic transactions according to one or more disclosed aspects.

FIG. 6 illustrates a block diagram of an example system 600 that provides security for electronic transactions involving DMCs according to one or more aspects of the subject disclosure. System 600 comprises a coupon management apparatus 602 that is configured to provide management services for mobile coupons, mobile coupon accounts, or mobile coupon-related transactions. The coupon management system 602 can be configured to provide security in electronic commerce. Furthermore, the management system 602 can be configured to securely access DMC user accounts, and user commercial accounts to redeem DMCs in conjunction with an electronic transaction, and secure payment for such transactions.

Coupon management system 602 comprises a security module 604 that facilitates secure electronic communication for the management apparatus 602. Security module 604 can comprise one or more of various mechanisms (606A, 606B, 606C, 606D) for secure communication. As an example, security module 604 can comprise a digital certificate 606A with public or private keys 606B for digital certificate-based secure communications. As another example, the security module 604 can comprise a set of usernames and passwords for user DMC accounts, and employ an encryption algorithm 606D in conjunction with the usernames/passwords 606C to provide secure communications. Secure communications pertinent to DMC transactions can involve accessing DMC user accounts to obtain a state of active DMCs associated with a user's account. Additionally, such communications can involve interaction with a user's financial account (e.g., savings account, checking account, credit account, debit account, investment account, and so on) to access payment for electronic transactions. Communications between the management apparatus 602 and commercial account database 620 can be secured as described above.

Further to the above, coupon management apparatus 602 can establish a secure communication link with a commercial client 608, employing a client security module 610, involved in electronic commerce. The client security module 610 can employ similar mechanisms as provided by security module 604 (e.g., digital certificate and public/private keys, username and password combination, encryption algorithm, etc.). Accordingly, commercial client 608 can secure information passed to coupon management apparatus 602 pertaining to the commercial client (e.g., including product/service lists, prices, issued DMCs pertinent to the product/service lists, or the like). Coupon management system 602 can furthermore send a secure invoice 612 for products and services, as described herein, employing the secure communication link.

According to other aspects of the subject disclosure, a mobile client 614 can employ a mobile security module 616. As described above, mobile security module 616 can employ digital certificates, password/username combinations, encryption algorithms, and so on. Based on such mechanisms, mobile client 614 can establish a secure wireless communication link with commercial client 608. Product/service selections, DMCs, application of a DMC to a product/service, or like activities involved in DMC-related mobile commerce can be secured via such a link. Additionally, mobile client can establish a secure link with coupon management apparatus 602, for instance utilizing a mobile network base station as a wireless interface, employing mobile security module 616 and security module 604. Accordingly, system 600 can provide reduced likelihood of spoofing attacks, or data interception from the mobile client 614, commercial client 608, coupon management apparatus 602, or commercial account 620, or a suitable combination thereof.

Figure 7:
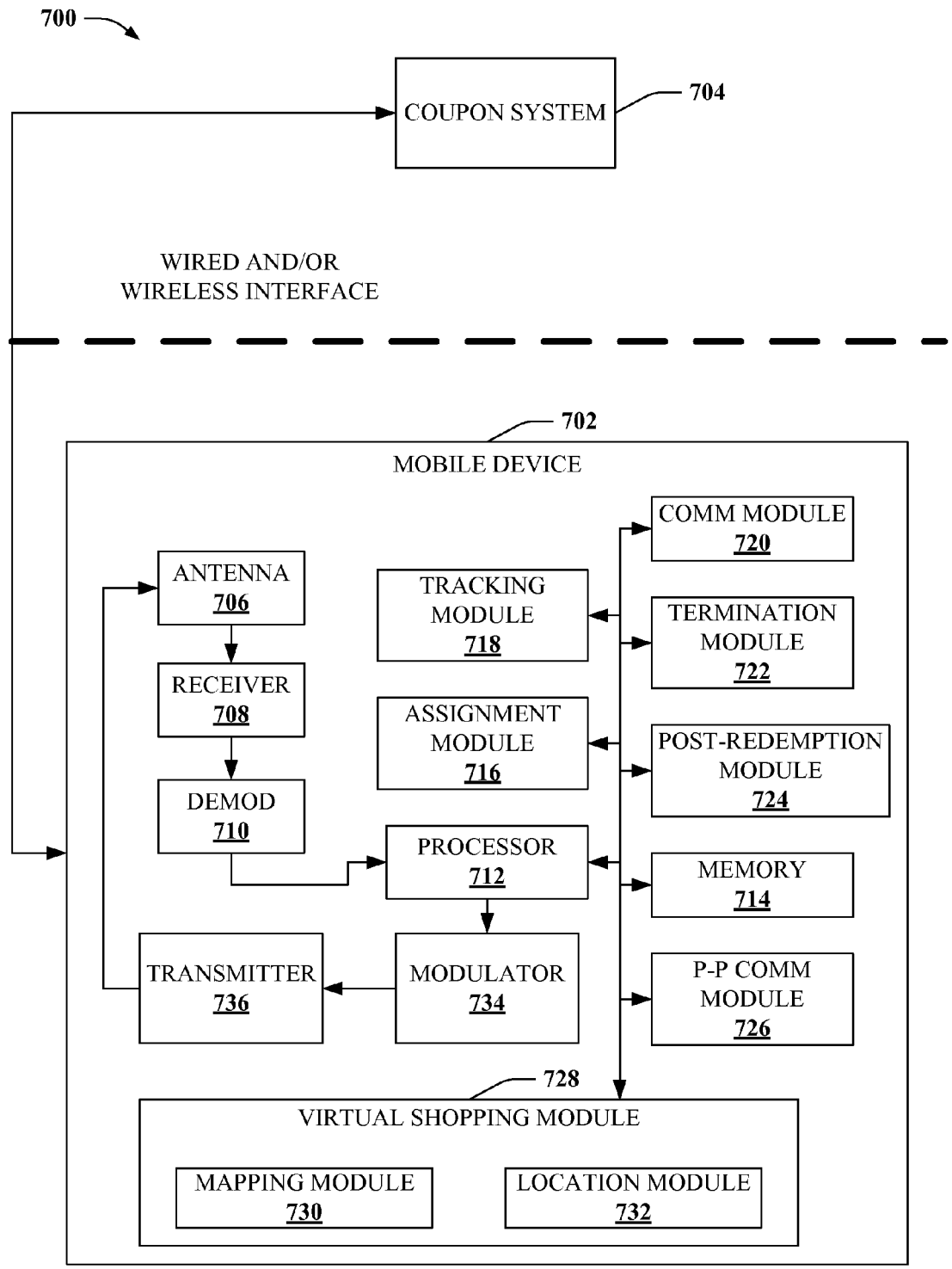
FIG. 7 depicts a block diagram of a sample mobile device for facilitating DMC management in mobile-related commerce according to one or more further aspects.

FIG. 7 depicts a block diagram of an example system 700 comprising a mobile device 702 configured for wireless communication according to aspects of the subject disclosure. Mobile device 702 can be configured to wirelessly couple with one or more remote transceivers (e.g., access point—not depicted) of a wireless network. For instance, mobile device 702 can receive wireless signals from a base station on a forward link channel and respond with wireless signals on a reverse link channel. Through the wireless network, mobile device 702 can exchange data with a coupon system 704 for managing DMCs, as described herein. In addition, mobile device 702 can comprise instructions stored in memory 714 for receiving a DMC assignment, tracking activity pertinent to the DMC or redemption of the DMC, communicating with a peer device, or implementing virtual shopping, as described herein.

Mobile device 702 includes at least one antenna 706 (e.g., a wireless transmission/reception interface or group of such interfaces comprising an input/output interface) that receives a signal and receiver(s) 708, which performs typical actions (e.g., filters, amplifies, down-converts, etc.) on the received signal. In general, antenna 706, and a transmitter 736 (collectively referred to as a transceiver) can be configured to facilitate wireless data exchange with remote transceiver(s) 704.

Antenna 706 and receiver(s) 708 can also be coupled with a demodulator 710 that can demodulate received symbols and provide such signals to a data processor 712 for evaluation. It should be appreciated that data processor 712 can control and/or reference one or more components (706, 708, 710, 714, 716, 718, 720, 722, 724, 726, 728, 730, 732) of the mobile device 702. Further, data processor 712 can execute one or more modules, applications, engines, or the like (716, 718, 720, 722, 724, 726, 728, 730, 732) that comprise information or controls pertinent to executing functions of the mobile device 702. For instance, such functions can include tracking information pertinent to dynamic characteristics of DMC associated with mobile device 702. In addition, functions can include uploading the pertinent information to coupon system 704, obtaining a state of associated DMCs in response, displaying the state to a user of mobile device 702, assisting in redemption of the DMC in mobile-related commerce, or like operations, as described herein.

Additionally, the memory 714 of mobile device 702 is operatively coupled to data processor 712. Memory 714 can store data to be transmitted, received, and the like, and instructions suitable to conduct wireless communication with a remote device (704). Specifically, the instructions can be utilized to implement the various functions described above, or elsewhere herein. Further, memory 714 can store the modules, applications, engines, etc. (716, 718, 720, 722, 724, 726, 728, 730, 732) executed by data processor 712, above.

Further to the above, mobile device 702 can comprise an assignment module 716 that associates a DMC with a user of mobile device 702 based on assignment of the DMC to a particular DMC user account by coupon system 704. Additionally, a tracking module 718 can monitor data pertinent to variable characteristics of such DMC. The pertinent data can include a time of day, day of the week, previous mobile-related transactions conducted by mobile device 702, position location of mobile device 702, special offers conveyed by a remote transceiver (704) to mobile device 702 (e.g., a transmitter of a retail store might broadcast double coupon points for a limited time, or like special offer), and so on. A communication module 720 can submit the pertinent data to coupon system 704, and obtain a response to the submission that affects a state of the DMC user account, or a status of the DMC. For instance, the response can specify a current status of the DMC (e.g., including current state of dynamic benefits provided by the DMC). As another example, the response can enable or disable sharing of DMCs among other mobile device user accounts, establish the DMC as fixed/dynamic, engage post-redemption activity tracking for one or more DMCs, trigger virtual shopping, and so forth, as described herein.

Further to the above, mobile device 702 can comprise a termination module 722 that can terminate monitoring of data by tracking module 718. Such termination can be based on the response received from coupon system 704, described above (e.g., if a DMC is set to fixed). Termination module 722 can enforce a default state (e.g., a predetermined state, previously determined state, most-recently determined state, etc.) on the fixed DMC, including default benefits, default transaction conditions, default product/service applicable for the transaction, or the like. In addition to the foregoing, the termination module can re-initiate monitoring of the data by tracking module 718 based on the response (e.g., if the response changes the fixed setting to dynamic).

According to some aspects of the subject disclosure, mobile device 702 can comprise a post-redemption module 724 that monitors activity pertinent to a DMC user account associated with mobile device 702 after redemption of a DMC. Such activity monitoring can be based on the response received by the communication module 520 from coupon system 704 (e.g., where the response activates a post-redemption flag of the DMC). The post-redemption module 724 can track activity specified in the response, or default activity stored in memory 714. Tracked activities can be uploaded to coupon system 704 for application of post-redemption benefits as described herein.

In some aspects of the subject disclosure, post-redemption activities can be based on DMC sharing between mobile device 702 and another mobile device (not depicted). Such sharing can be facilitated with a peer-to-peer communication module 726, which enables direct wireless communication between peer mobile devices. The communication can involve transmitting or receiving a copy of a DMC to/from a peer device, or transmitting/receiving a redemption acknowledgement pertaining to a shared DMC. The exchanged information can be tracked by post-redemption module 724, where suitable, in conjunction with applying DMC benefits to a user account (not depicted).

According to one or more other aspects of the subject disclosure, mobile device 702 can comprise a virtual shopping module 728. Virtual shopping module 728 can communicatively couple with a commercial entity (not depicted, but see 406A for FIG. 4) to facilitate mobile-related transactions with the commercial entity. As one example, the virtual shopping module 728 can provide payment information (e.g., bank account, credit account, debit account, money wire, etc.) to the commercial entity for payment of goods or services provided by the commercial entity. The virtual shopping module 728 can also convey a DMC account ID to the commercial entity, along with DMC IDs pertinent to the goods or services. Payment can be updated, where suitable, based on benefits provided by the pertinent DMCs.

Additionally, virtual shopping module 728 can query the commercial entity for a list of products/services available for mobile-related commerce. The list can be displayed on a user interface display of the mobile device 702. Additionally, the virtual shopping module 728 can submit an ID of a DMC user account or DMC and obtain a list of products/services affected by the DMC or DMCs of the user account. Affected products/services can be highlighted at the user interface display, along with benefits applicable to those associated products/services in conjunction with redeeming one or more DMCs. In at least some aspects of the subject disclosure, the virtual shopping module 728 can submit suitable information to coupon system 704 identifying other accounts associated with a user of mobile device 702. Such accounts can include loyalty accounts of the commercial entity, frequent-shopper accounts, a frequent DMC user account, and so forth. Benefits provided by those accounts to one or more products/services of the received list can be obtained in response to the submission and highlighted at the user interface display.

In at least one aspect of the subject disclosure, virtual shopping module 728 can comprise a mapping module 730. The mapping module can obtain a digital map of a retail store associated with a commercial entity (e.g., see FIG. 5, supra) and display the digital map on the user interface display. The map can be populated with locations of products or services selected by the user of mobile device 702. Additionally, a location module 732 can determine a position location of the mobile device 702, and update the digital map with the position location. The mapping module 730 can generate navigation routes within the retail store between the position location and product/services locations, updating the position location as the mobile device 702 moves throughout the store. Thus, mobile device 702 can provide a fully integrated virtual shopping experience, integrating benefits provided by DMCs associated with the mobile device 702, as well as other user benefit accounts associated with users of the mobile device 702.

The aforementioned systems have been described with respect to interaction between several components, modules, and/or communication interfaces. It should be appreciated that such systems and components/modules/interfaces can include those components or sub-components specified therein, some of the specified components or sub-components, and/or additional components. For example, a system could include mobile device 500, point of sale device 216 and wireless router 220, coupon management apparatus 402, and third party server 320 coupled with user account database 322, or a different combination of these or other components. Sub-components could also be implemented as components communicatively coupled to other components rather than included within parent components. Additionally, it should be noted that one or more components could be combined into a single component providing aggregate functionality. For instance, post-transaction module 304 can include tracking module 306, or vice versa, to facilitate identifying and tracking post-redemption activity pertaining to a DMC, and updating a user account based on such activity, by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 8-11B. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 8:
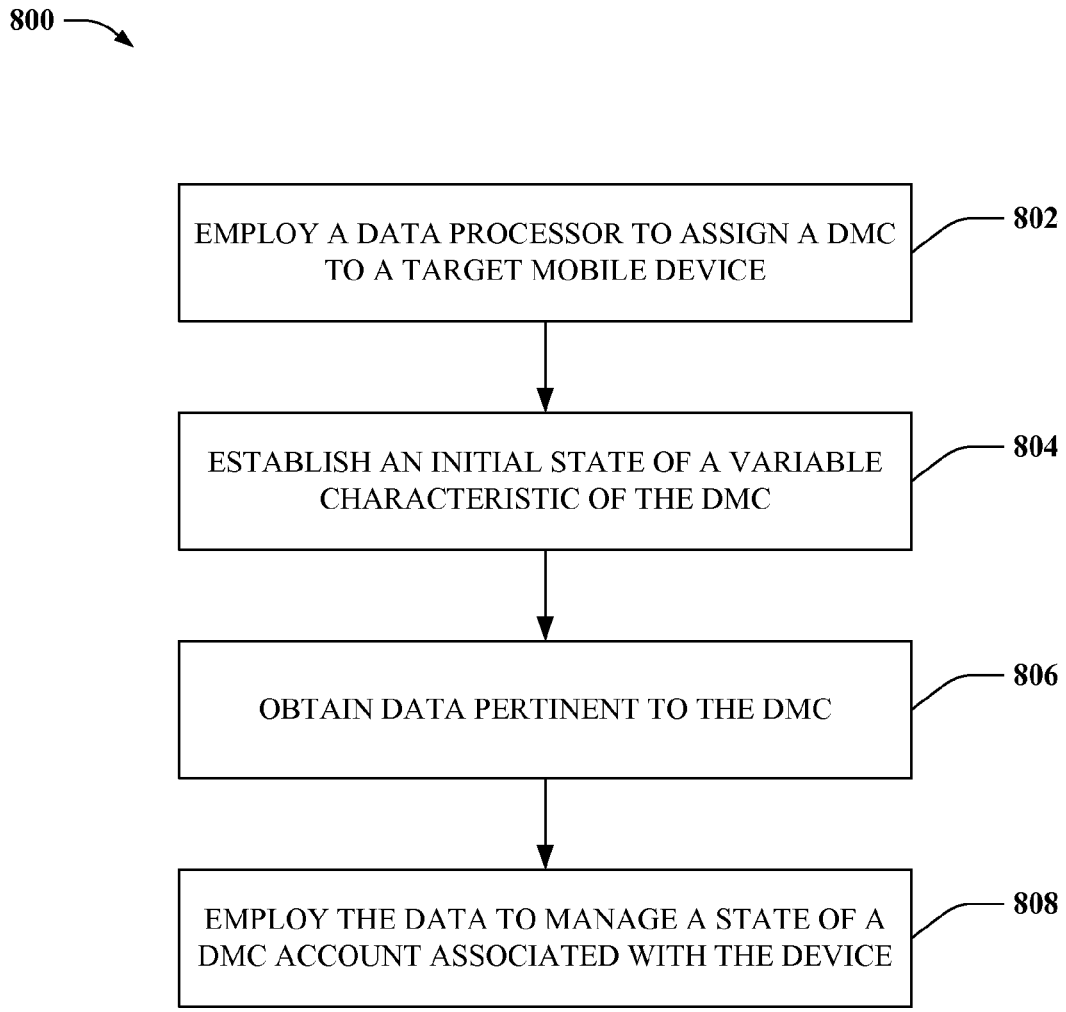
FIG. 8 illustrates a flowchart of an example methodology for managing DMCs in a mobile communication environment, according to one aspect.

FIG. 8 depicts a flowchart of an example methodology 800 for providing network management of DMCs in mobile commerce according to aspects of the subject disclosure. At 802, method 800 can employ a data processor to assign a DMC to a target mobile device. Selection of the target mobile device can be based on suitable criteria analyzed by the data processor. Examples of such criteria can include location of the mobile device, time of day, day of the week, proximity of the mobile device to a DMC distribution entity, proximity of the mobile device to a DMC redemption entity or retail entity, previous DMC user account activity, previous mobile-commerce activity, previous peer to peer DMC sharing activity, or the like, or a suitable combination thereof.

At 804, method 800 can establish an initial state of a variable characteristic of the assigned DMC. The variable characteristic can comprise a variable benefit provided by the DMC, transactions applicable to the DMC, product/service involved in such transaction, logistics pertaining to redemption of the DMC (e.g., time of redemption, place of redemption), and so forth. At 806, method 800 can obtain data pertinent to the variable characteristic of the DMC. Such data can be employed in determining a current state of the variable characteristic, based on changes in the data and rules for characterizing the current state. At 808, method 800 can employ the data in managing a state of a DMC account associated with the device, or a status of the DMC. The status of the DMC can comprise a dynamic/fixed status, as described herein, for instance. Alternatively the status of the DMC can comprise a sharable/non-sharable status, post-redemption/non post-redemptions status, or the like. Status of the DMC account can comprise initiation of a virtual shopping session, integrating third party commercial benefit accounts with the DMC account, or activation/deactivation of DMC sharing with the DMC account, identification of authorized sharing partners associated with the DMC account, or the like.

Figure 9:
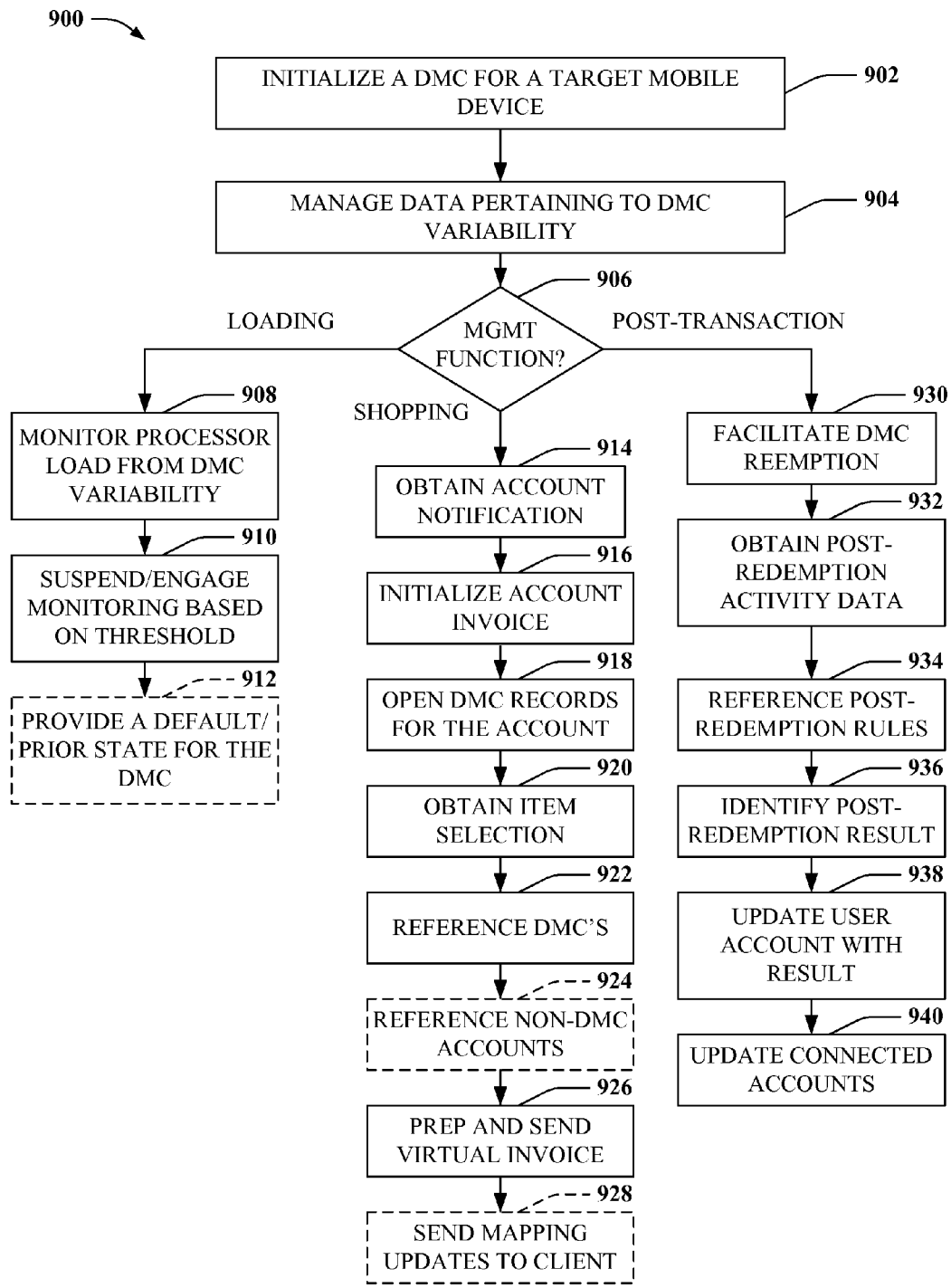
FIG. 9 illustrates a flowchart of a sample methodology for network-facilitated mobile-related commerce employing DMCs, according to one aspect.

FIG. 9 illustrates a flowchart of an example methodology for providing network-based management of DMCs in mobile-related commerce according to aspects of the subject disclosure. At 902, method 900 can initialize a DMC for a target mobile device. At 904, method 900 can manage data pertaining to variability of the DMC. At 906, a determination can be made as to selection of a management function in conjunction with the mobile-related commerce. If loading management is selected, method 900 can proceed to 908. If post-transaction accounting is selected, method 900 can proceed to 930. Otherwise, if virtual shopping is selected, method 900 can proceed to 914.

At 908, method 900 can monitor processor load based on management of data pertaining to DMC variability conducted at reference number 904. At 910, method 900 can suspend or engage the monitoring based on comparison of the processor load with one or more load thresholds. At 912, method 900 can optionally provide a mobile device user account with a default state for suspended DMCs. The default state can comprise default benefit settings, default transactions, default products/services applicable to redemption of a DMC, default logistics pertaining to the transactions/redemption, or the like. Method 900 can end after reference number 912, or can optionally return to decision 906 for further management selection.

At 914, method 900 can obtain a notification of a DMC user account in conjunction with a virtual shopping command. At 916, method 900 can initialize an account invoice for the DMC user account in response to the virtual shopping command. At 918, method 900 can obtain and access DMC records for the DMC user account. The DMC records can identify DMCs associated with the DMC user account, whether the DMCs are active, what products/services the DMCs provide benefits for, and so on. At 920, method 900 can obtain an item selection. At 922, method 900 can reference the DMC records to identify a DMC(s) applicable to the selected item. At 924, method 900 can optionally reference non-DMC accounts (e.g., loyalty account, frequent-shopper account, frequent-purchaser/flyer/guest account, etc.) associated with a user of the DMC user account, to determine applicability to the selected item. At 926, method 900 can prepare and send a virtual invoice for the item, reflecting benefits provided by applicable DMCs, and optionally benefits provided by applicable non-DMC accounts. The virtual invoice can then be forwarded to a mobile device associated with the DMC user account, or a point of sale device coupled with the mobile device. At 928, method 900 can optionally submit mapping updates to the mobile device for the selected item, to facilitate virtual mapping as described herein. From 928, method 900 can end, or optionally can return to reference number 906 for selection of another DMC management function.

At 930, method 900 can facilitate redemption of a DMC in conjunction with a transaction (e.g., as described by reference numbers 914 through 928). At 932, method 900 can obtain data pertaining to post-redemption activity pertinent to the redeemed DMC. At 934, method 900 can reference a set of rules for post-redemption activity. At 936, method 900 can identify an action or result to be implemented from the post-redemption activity rules, based on the post-redemption activity data. At 938, method 900 can update a DMC user account with a post-redemption benefit specified by the rules. At 940, method 900 can update related accounts (e.g., DMC account, banking account, credit account, etc.) as suitable, for instance to provide a rebate, assign an additional DMC, provide a cash-back reward, and so on. From 940, method 900 can end, or optionally can return to reference number 906 for selection of another DMC management function.

Figure 10:
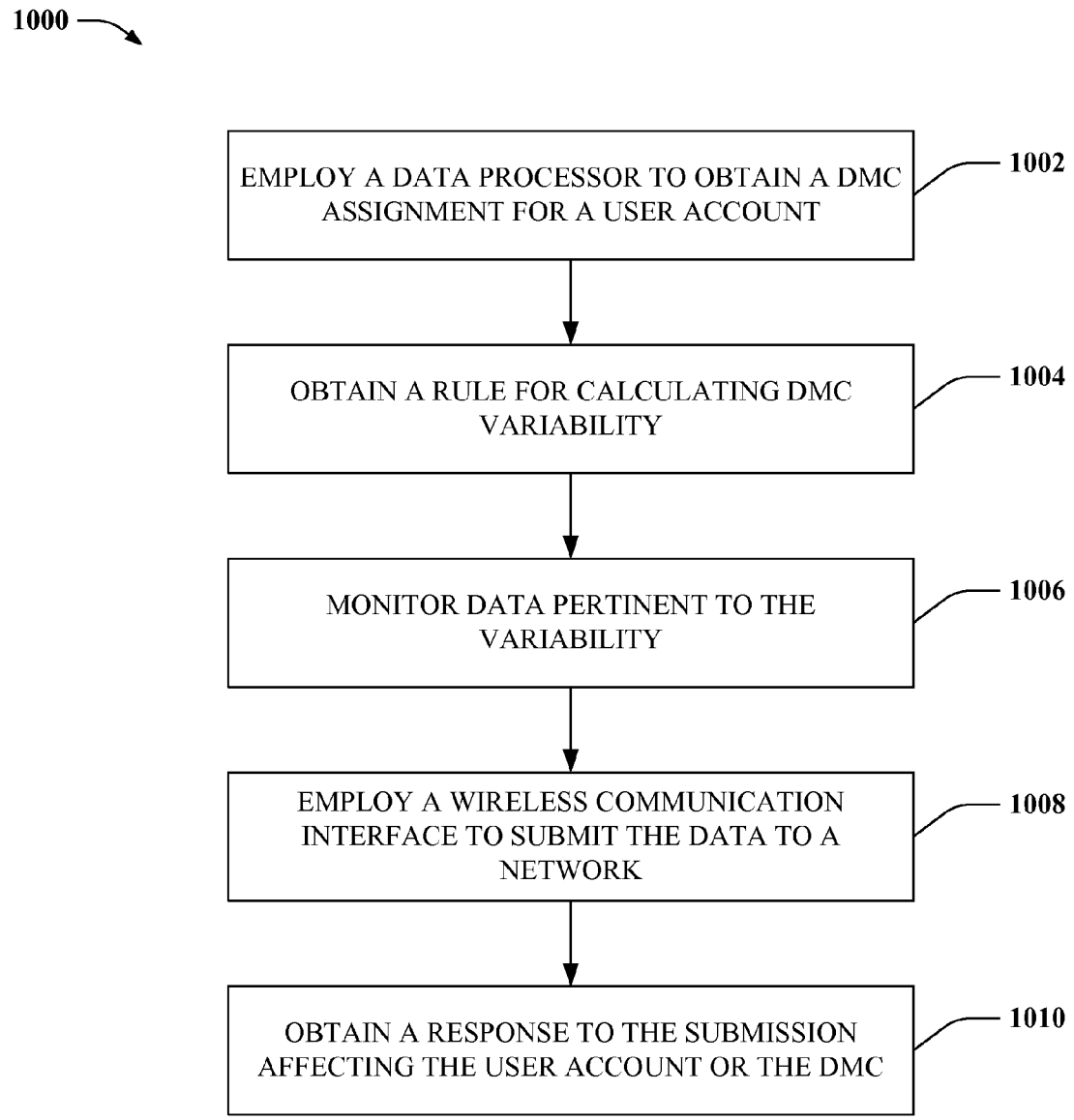
FIG. 10 depicts a flowchart of a sample methodology for facilitating management of DMCs in a mobile communication environment, according to one aspect.

FIG. 10 illustrates a flowchart of an example methodology for facilitating network-based DMC management according to additional aspects of the subject disclosure. At 1002, method 1000 can employ a data processor to obtain a DMC assignment for a DMC user account. At 1004, method 1000 can employ the data processor to obtain a rule for calculating DMC variability. At 1006, method 1000 can employ the data processor to monitor data pertinent to the DMC variability, as described herein. At 1008, method 1000 can employ a wireless communication interface to submit the data to a network entity that manages variability of the DMC. At 1010, method 1000 can obtain a response to the submission affecting the DMC user account or the DMC. Specifically, the response can set a status of the DMC or the DMC user account, as related to mobile commerce.

Figure 11A:
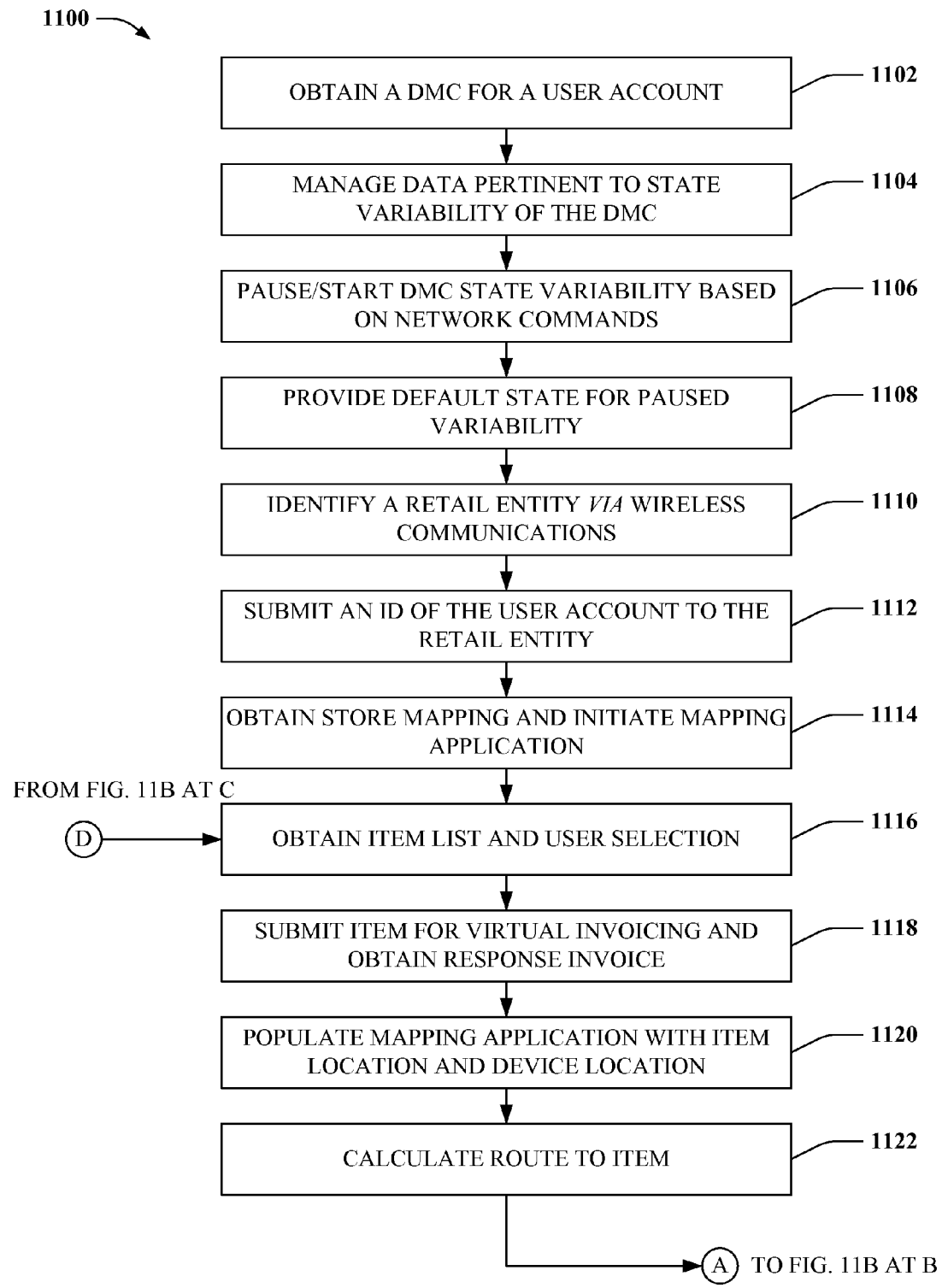
FIGS. 11A and 11B depict a flowchart of a sample methodology for facilitating network-implemented management of DMCs in mobile-related commerce, according to one aspect.
Figure 11B:
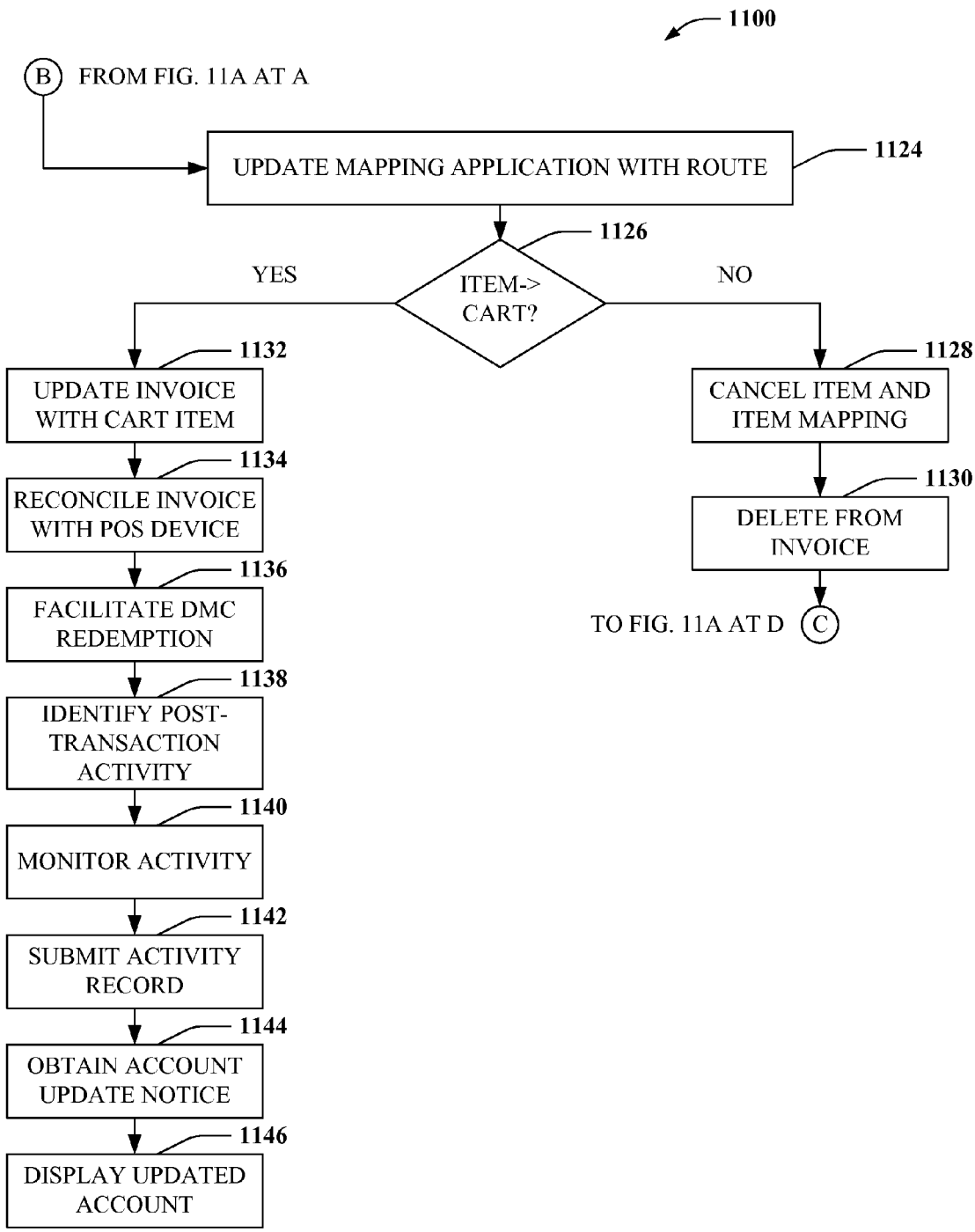

FIGS. 11A and 11B illustrate a flowchart of an example methodology 1100 for facilitating network-managed mobile-commerce according to aspects of the subject disclosure. At 1102, method 1100 can obtain a DMC assigned to a DMC user account. At 1104, method 1100 can manage data pertinent to state variability of the DMC. At 1106, method 1100 can receive a network command pertinent to the state variability, and pause or re-initiate the state variability management based on the network command. At 1108, method 1100 can associate a default state with the DMC if the network command involves pausing state variability management.

At 1110, method 1100 can obtain and identify a retail entity by wireless signals broadcast by a transmitter employed by the retail entity. At 1112, method 1100 can submit an ID of the DMC user account to the retail entity. Submitting the ID can be accomplished by transmitting suitable wireless signals to a receiver of the retail entity. At 1114, method 1100 can obtain mapping application data for a retail store of the retail entity, and initiate a mapping application that displays a layout of the retail store. At 1116, method 1100 can obtain an item list from the retail entity, and a user selection of at least one item from the list. At 1118, method 1100 can submit the selected item for virtual invoicing and obtain an invoice in response. Specifically, the invoice can include transaction information (e.g., purchase price) associated with the selected item. Additionally, the transaction information can reflect applicable benefits provided by DMCs related to the selected item, or other benefit accounts associated with a user of the DMC user account, and pertinent to the selected item.

At 1120, method 1100 can obtain virtual position location of the selected item with respect to the retail entity mapping layout, and populate the mapping application display with item location. Additionally, a location of user of the DMC user account can be populated to the application display. At 1122, method 1100 can calculate an efficient route through the store layout between the user location and item position location.

Turning to FIG. 11B, at 1124, method 1100 update the mapping application with the route calculated at reference number 1122. At 1126, a determination can be made as to whether the selected item is placed in a shopping cart by a user of the DMC user account. The shopping cart can be a physical shopping cart within the retail store, or can be a virtual shopping cart managed by a mobile device shopping application. Verification that the item is physically placed in the shopping cart can be obtained from receiving an ID of the selected item from a mobile device (e.g., where the mobile device scans in the ID, or a user manually types in the ID). Verification that the item is placed in the virtual shopping cart can be obtained from the mapping application. An assumption can be made that a user takes possession of the item if the virtual shopping cart verification is obtained.

If it is determined at reference number 1126 that the selected item is not placed in the shopping cart (e.g., failure to receive shopping cart verification, or receiving a cancellation of the selected item), method 1100 can proceed to 1128 where the item is cancelled from the mapping application display. Furthermore, at 1130, the item can be deleted from the virtual invoice. From 1130, method 1100 can return to reference number 1116 of FIG. 11A.

If at reference number 1126, method 1100 determines that an item is placed in a physical or virtual shopping cart, method 1100 proceeds to 1132 where the virtual invoice can be updated to reflect the addition of the selected item to the shopping cart. At 1134, method 1100 can reconcile the updated virtual invoice with a point of sale device of the commercial entity. Specifically, shopping cart items can be conveyed to the point of sale device (e.g., via wireless communication between a mobile device maintaining the virtual invoice, or by displaying the items on a screen of the mobile device for optical scanning, or manual entry by a point of sale device or store employee) to facilitate the reconciliation. At 1136, method 1100 can facilitate redemption of one or more DMCs applicable to the selected item in conjunction with a transaction involving the selected item.

At 1138, method 1100 can identify whether any post-transaction activity or benefits are pertinent to the DMC or transaction. At 1140, method 1100 can monitor specified post-transaction activity. At 1142, method 1100 can submit a record of the post-transaction activity to a network entity managing the DMC. At 1144, method 1100 can obtain a response to the submission. In some aspects, the response can comprise a notice that post-redemption benefits are applied to a user account based on the post-transaction activity. At 1146, the notice or updated user account information can be displayed to a user.

Figure 12:
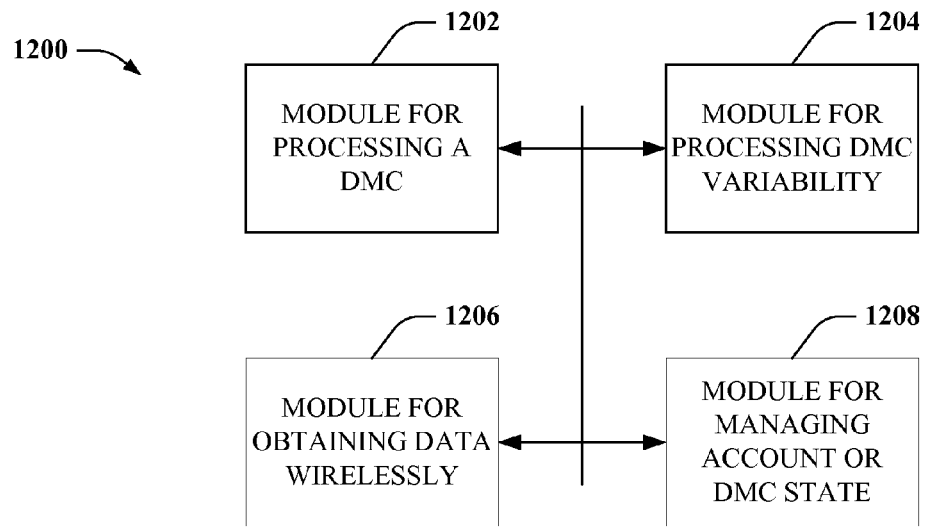
FIGS. 12 and 13 illustrate respective block diagrams of example systems for implementing and facilitating network management of DMCs for a mobile device, according to one aspect.
Figure 13:
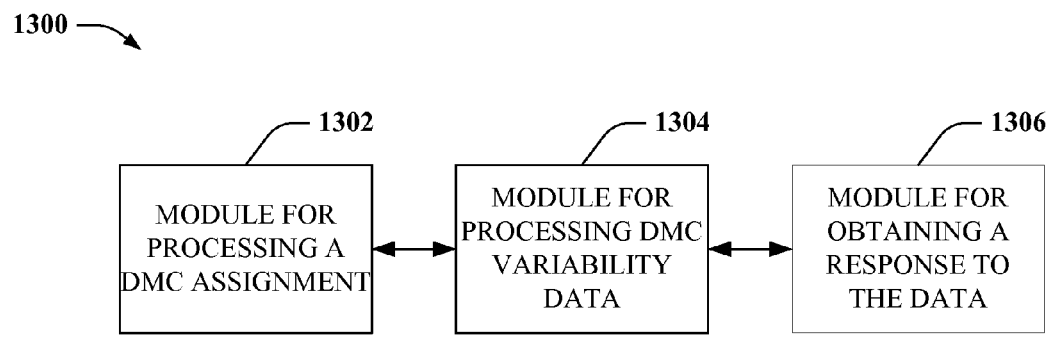

FIGS. 12 and 13 depict block diagrams of example systems 1200, 1300 for implementing and facilitating, respectively, management of DMCs in mobile-related commerce, according to one or more aspects of the subject disclosure. For example, systems 1200 and 1300 can reside at least partially within a wireless communication network and/or within a transmitter such as a node, base station, access point, user terminal, personal computer coupled with a mobile interface card, or the like. It is to be appreciated that systems 1200 and 1300 are represented as including functional blocks, which can be functional blocks that represent functions implemented by a processor, software, or combination thereof (e.g., firmware).

System 1200 can comprise a module 1202 for processing a DMC. Processing can involve assigning a DMC to a user account associated with system 1200. Furthermore, system 1200 can comprise a module 1204 for processing data pertaining to variable characteristics of the DMC. The module 1204 can output a status of the DMC based on the processed data. The status can comprise a current state of benefits provided by the DMC, transactions applicable to the DMC, post-redemption status of the DMC, and so on. The module 1204 can identify data affecting the status from a set of variability rules maintained by module 1204. Furthermore, module 1204 can reference a fixed/dynamic flag associated with the DMC, and condition processing the pertinent data on a status of the fixed/dynamic flag, as described herein. The pertinent data can be received from a remote transceiver device (e.g., point of sale device, mobile device) by a module 1206 for obtaining and processing wireless data. The module 1206 can comprise a wireless transceiver, receiver and transmitter, as well as suitable processing components for processing received wireless signals. Additionally, system 1200 can comprise a module 1208 for managing a state of a DMC user account, or status of a DMC based on the pertinent data, as described herein.

System 1300 can comprise a module 1302 for processing a DMC assignment. Processing can involve identifying a DMC user account assigned to the DMC, and identifying a user of system 1300 associated with the DMC user account. Additionally, the module 1302 can display the DMC or an indication thereof to identified user of system 1300, upon such user logging in to the system 1300, for instance. Furthermore, system 1300 can comprise a module 1304 for processing data pertaining to variable characteristics of the DMC. The module 1304 can identify pertinent data from a set of variability rules maintained by the module 1304. Furthermore, the module 1304 can reference a fixed/dynamic flag associated with the DMC, and condition processing the pertinent data on a status of the fixed/dynamic flag, as described herein. Processed data can be transmitted by the module 1304 to a network based DMC management apparatus, for determining a state of the DMC based on the processed data. Further to the above, system 1300 can comprise a module 1306 for obtaining data wirelessly. The module 1306 can receive a response to the transmission of processed data, specifying a state of the DMC user account, or a status of the DMC, as specified herein. The state or status can be output to a user of system 1300, optionally upon request of the user.

Figure 14:
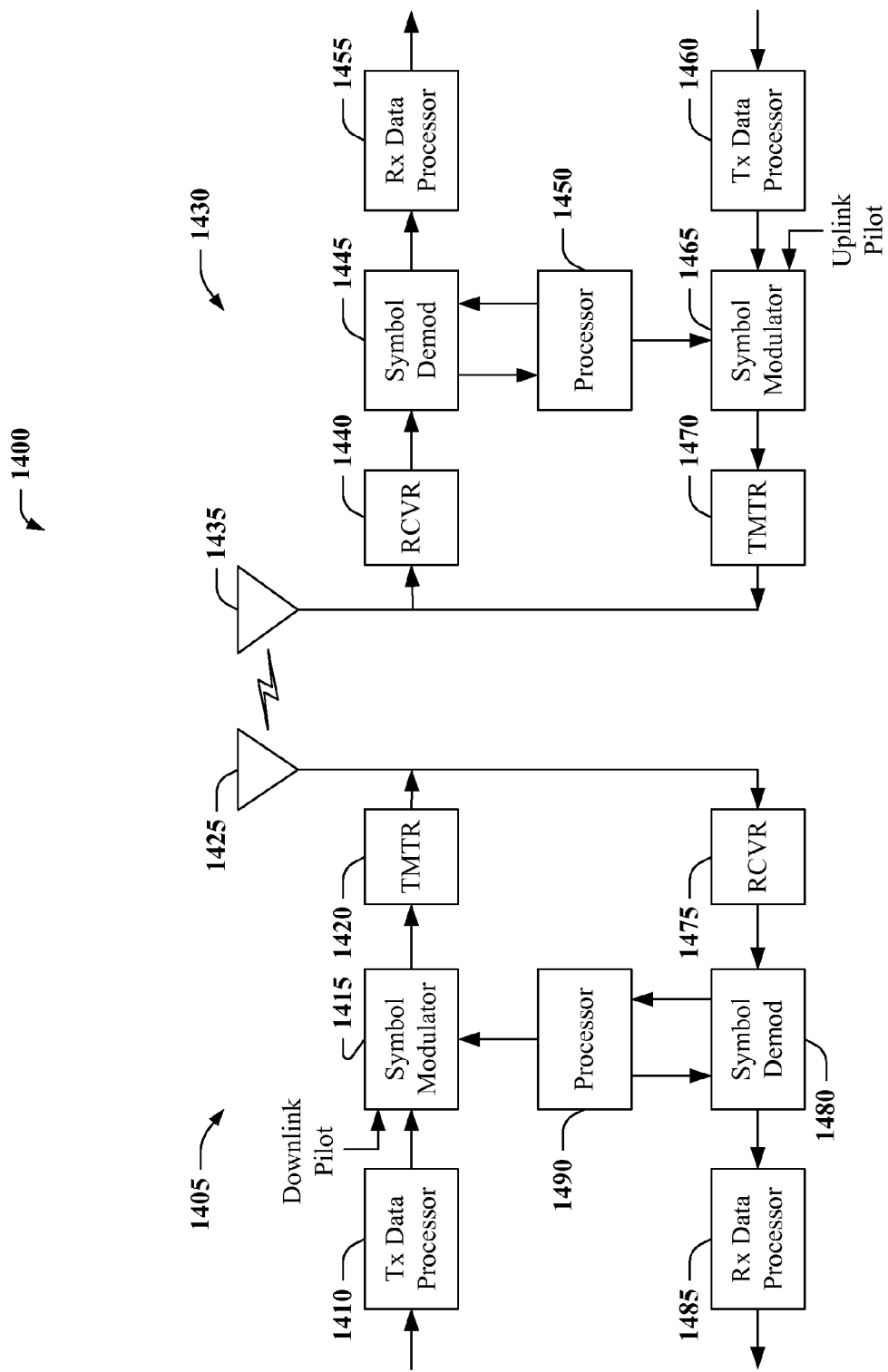
FIG. 14 depicts a block diagram of an example wireless communication environment for implementing one or more aspects of the subject disclosure.

FIG. 14 depicts a block diagram of an example system 1400 that can facilitate wireless communication according to some aspects disclosed herein. On a downlink, at access point 1405, a transmit (TX) data processor 1410 receives, formats, codes, interleaves, and modulates (or symbol maps) traffic data and provides modulation symbols ("data symbols"). A symbol modulator 1415 receives and processes the data symbols and pilot symbols and provides a stream of symbols. A symbol modulator 1420 multiplexes data and pilot symbols and provides them to a transmitter unit (TMTR) 1420. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1420 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1425 to the terminals. At terminal 1430, an antenna 1435 receives the downlink signal and provides a received signal to a receiver unit (RCVR) 1440. Receiver unit 1440 conditions (e.g., filters, amplifies, and frequency downconverts) the received signal and digitizes the conditioned signal to obtain samples. A symbol demodulator 1445 demodulates and provides received pilot symbols to a processor 1450 for channel estimation. Symbol demodulator 1445 further receives a frequency response estimate for the downlink from processor 1450, performs data demodulation on the received data symbols to obtain data symbol estimates (which are estimates of the transmitted data symbols), and provides the data symbol estimates to an RX data processor 1455, which demodulates (i.e., symbol demaps), deinterleaves, and decodes the data symbol estimates to recover the transmitted traffic data. The processing by symbol demodulator 1445 and RX data processor 1455 is complementary to the processing by symbol modulator 1415 and TX data processor 1410, respectively, at access point 1405.

On the uplink, a TX data processor 1460 processes traffic data and provides data symbols. A symbol modulator 1465 receives and multiplexes the data symbols with pilot symbols, performs modulation, and provides a stream of symbols. A transmitter unit 1470 then receives and processes the stream of symbols to generate an uplink signal, which is transmitted by the antenna 1435 to the access point 1405. Specifically, the uplink signal can be in accordance with SC-FDMA requirements and can include frequency hopping mechanisms as described herein.

At access point 1405, the uplink signal from terminal 1430 is received by the antenna 1425 and processed by a receiver unit 1475 to obtain samples. A symbol demodulator 1480 then processes the samples and provides received pilot symbols and data symbol estimates for the uplink. An RX data processor 1485 processes the data symbol estimates to recover the traffic data transmitted by terminal 1430. A processor 1490 performs channel estimation for each active terminal transmitting on the uplink. Multiple terminals can transmit pilot concurrently on the uplink on their respective assigned sets of pilot subbands, where the pilot subband sets can be interlaced.

Processors 1490 and 1450 direct (e.g., control, coordinate, manage, etc.) operation at access point 1405 and terminal 1430, respectively. Respective processors 1490 and 1450 can be associated with memory units (not shown) that store program codes and data. Processors 1490 and 1450 can also perform computations to derive frequency and impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot subbands can be shared among different terminals. The channel estimation techniques can be used in cases where the pilot subbands for each terminal span the entire operating band (possibly except for the band edges). Such a pilot subband structure would be desirable to obtain frequency diversity for each terminal. The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof With software, implementation can be through modules (e.g., procedures, functions, and so on) that perform the functions described herein. The software codes can be stored in memory unit and executed by the processors 1490 and 1450.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a UT. A UT can also be called a system, a subscriber unit, a subscriber station, mobile station, mobile, mobile communication device, mobile device, remote station, remote terminal, access terminal (AT), user agent (UA), a user device, or user equipment (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary aspects, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture" as used herein is intended to encompass a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method, comprising:
employing a data processor to execute instructions for managing a dynamic mobile coupon (DMC), the instructions causing the data processor to:
assign the DMC to a target mobile device;
establish an initial state of a variable characteristic of the DMC based on a factor pertinent to the target mobile device or a user account related to such device; and
toggling a variability state of the DMC by suspending variability of the variable characteristic when the data processor exceeds a processing load threshold associated with processing DMC characteristics, and/or restoring variability of the suspended variable characteristic when the data processor falls below the processing load threshold;
employing a communication interface to obtain data pertinent to the DMC; and
employing the data processor to manage a state of a DMC account associated with the target mobile device based on the data pertinent to the DMC.

2. The method of claim 1,
wherein managing the state of the DMC account further comprises evaluating a subsequent state of the variable characteristic based on at least one change to the factor that occurs after redemption of the DMC by the target mobile device, wherein the redemption of the DMC by the target mobile device occurs in response to providing a user of the target mobile device with instructions for navigating to an item associated with the DMC, detecting that the user of the target mobile device has placed the item in a shopping cart, updating an invoice for the item in response to the detection based on the initial state of the variable characteristic and detecting that the user has completed purchase of the invoiced item.

3. The method of claim 2, further comprising evaluating processing load on the data processor resulting from evaluating the subsequent state.

4. The method of claim 1, wherein managing the state of the DMC account further comprises updating the user account after redemption of the DMC.

5. The method of claim 4, further comprising modifying a value of the user account based on a post-redemption activity.

6. The method of claim 4, wherein updating the user account further comprises:

tracking user-to-user sharing of one or more DMCs involving the user account;
identifying redemption of a shared DMC for a disparate user account;
establish a value to the user account based on redemption of the shared DMC; and
updating the user account by the established value.

7. The method of claim 4, wherein managing the state of a user account further comprises:
identifying multiple products associated with the DMC;
obtaining data pertinent to redemption of the DMC with respect to a first of the multiple products;
obtaining data pertinent to a transaction involving a second of the multiple products;
establishing a value for the transaction involving the second product's subsequent redemption of the DMC for the first product; and
updating the user account by the established value.

8. The method of claim 1, wherein managing the state of the DMC account further comprises automatically generating a virtual invoice for the user account based on data submitted by the target mobile device.

9. The method of claim 8, further comprising extracting from the submitted data a DMC identifier (ID) and an ID of a product or service associated with the DMC.

10. The method of claim 8, further comprising:
modifying a price of a product or service based on a characteristic of the DMC; and
submitting the modified price of the product or service to the target mobile device.

11. The method of claim 8, further comprising receiving an ID of a retail entity from a network server and cross-referencing one or more products of the retail entity with one or more DMCs associated with the target mobile device.

12. The method of claim 11, further comprising modifying a transaction characteristic of a product or service based on a current state of at least one of the one or more DMCs to generate the virtual invoice, and submitting the virtual invoice to the target mobile device.

13. The method of claim 11, further comprising:
referencing a customer loyalty database associated with the retail entity and modifying a transaction characteristic of a product or service based on a state of a user loyalty account associated with the target mobile device; and
including the modified transaction characteristic in the virtual invoice.

14. The method of claim 1, wherein the DMC is bundled with a set of related or similar DMCs, and the DMC is assigned to the target mobile device as a part of the set.

15. The method of claim 1, further comprising employing the data processor to execute a network browser application that provides the target mobile device with a network interface to access the user account, view media associated with the DMC, share the DMC with other mobile device users, redeem the DMC in conjunction with a transaction, or a combination thereof.

16. A method, comprising:
assigning a dynamic mobile coupon (DMC) to a target mobile device;
establishing a first state of a variable characteristic of the DMC based on a factor pertinent to the target mobile device or a user account related to such device, the first state of the variable characteristic defining a first manner in which the target mobile device can redeem the DMC;
toggling a variability state of the DMC by suspending variability of the variable characteristic when a data processor exceeds a processing load threshold associated with processing DMC characteristics, and/or restoring variability of the suspended variable characteristic when the data processor falls below the processing load threshold;

redeeming the DMC based on the first state of the variable characteristic, wherein the redeeming of the DMC occurs in response to providing a user of the target mobile device with instructions for navigating to an item associated with the DMC, detecting that the user of the target mobile device has placed the item in a shopping cart, updating an invoice for the item in response to the detection based on the first state of the variable characteristic and detecting that the user has completed purchase of the invoiced item;

determining at least one change to the factor after redemption of the DMC by the target mobile device; and updating the redeemed DMC from the first state of the variable characteristic to a subsequent state of the variable characteristic based on the variability state of the DMC, the subsequent state of the variable characteristic defining a different benefit credited to the target mobile device and/or the user account for the redeemed DMC.

17. The method of claim 16, wherein the first state and the subsequent state define different transaction costs for a product or service associated with the DMC, different discount values for the product or service associated with the DMC, and/or one or more different products or services associated with the DMC.

18. The method of claim 16, wherein the factor corresponds to a degree to which the target mobile device shares the DMC with other devices and/or with other user accounts, and/or completing one or more subsequent transactions for a multiple-product transaction.

19. The method of claim 16,
wherein the instructions provide navigation data to a location of the item within a physical retail store,
wherein the shopping cart is a physical shopping cart,
wherein the detecting detects that the user of the target mobile device has placed the item in the physical shopping cart based upon a physical scan of the item or based upon manual user input.

20. The method of claim 16,
wherein the instructions provide virtual navigation data to a virtual location of the item within a virtual retail store, and
wherein the shopping cart is a virtual shopping cart.

21. An apparatus for wireless communication, comprising:
means for processing instructions for managing a dynamic mobile coupon (DMC), the instructions causing the means for processing to:
assign the DMC to a target mobile device;
establish an initial state of a variable characteristic of the DMC based on a factor pertinent to the target mobile device or a user account related to such device; and
means for toggling a variability state of the DMC by suspending variability of the variable characteristic when a data processor exceeds a processing load threshold associated with processing DMC characteristics, and/or restoring variability of the suspended variable characteristic when the data processor falls below the processing load threshold;
means for employing a communication interface to obtain data pertinent to the DMC; and
means for employing the data processor to manage a state of a DMC account associated with the target mobile device based on the data pertinent to the DMC.

22. The apparatus of claim 21,
wherein the means for managing is further configured to evaluate a subsequent state of the variable characteristic based on at least one change to the factor that occurs after redemption of the DMC by the target mobile device, wherein the redemption of the DMC by the target mobile device occurs in response to providing a user of the target mobile device with instructions for navigating to an item associated with the DMC, detecting that the user of the target mobile device has placed the item in a shopping cart, updating an invoice for the item in response to the detection based on the initial state of the variable characteristic and detecting that the user has completed purchase of the invoiced item.

23. An apparatus configured for wireless communication, comprising:
at least one processor configured to execute:
a first module for assigning a dynamic mobile coupon (DMC) to a target mobile device;
a second module for establishing an initial state of a variable characteristic of the DMC based on a factor pertinent to the target mobile device or a user account related to such device;
a third module for toggling a variability state of the DMC by suspending variability of the variable characteristic when a data processor exceeds a processing load threshold associated with processing DMC characteristics, and/or restoring variability of the suspended variable characteristic when the data processor falls below the processing load threshold;
a fourth module for employing a communication interface to obtain data pertinent to the DMC; and
a fifth module for employing the data processor to manage a state of a DMC account associated with the target mobile device based on the data pertinent to the DMC.

24. The apparatus of claim 23,
wherein the fifth module is further configured to evaluate a subsequent state of the variable characteristic based on at least, one change to the factor that occurs after redemption of the DMC by the target mobile device, wherein the redemption of the DMC by the target mobile device occurs in response to providing a user of the target mobile device with instructions for navigating to an item associated with the DMC, detecting that the user of the target mobile device has placed the item in a shopping cart, updating an invoice for the item in response to the detection based on the initial state of the variable characteristic and detecting that the user has completed purchase of the invoiced item.

25. A non-transitory computer-readable medium, comprising:
at least one instruction for causing a computer to assign a dynamic mobile coupon (DMC) to a target mobile device;
at least one instruction for causing the computer to establish an initial state of a variable characteristic of the DMC based on a factor pertinent to the target mobile device or a user account related to such device;
at least one instruction for causing the computer to toggle a variability state of the DMC by suspending variability of the variable characteristic when a data processor exceeds a processing load threshold associated with processing DMC characteristics, and/or restoring variability of the suspended variable characteristic when the data processor falls below the processing load threshold;

at least one instruction for causing the computer to obtain data pertinent to the DMC; and at least one instruction for causing the computer to manage a state of a DMC account associated with the target mobile device based on the data pertinent to the DMC.

26. The non-transitory computer-readable medium of claim 25, wherein the at least one instruction for causing the computer to manage the state of the DMC account is further configured to cause the computer to evaluate a subsequent state of the variable characteristic based on at least one change to the factor that occurs after redemption of the DMC by the target mobile device, wherein the redemption of the DMC by the target mobile device occurs in response to providing a user of the target mobile device with instructions for navigating to an item associated with the DMC, detecting that the user of the target mobile device has placed the item in a shopping cart, updating an invoice for the item in response to the detection based on the initial state of the variable characteristic and detecting that the user has completed purchase of the invoiced item.

* * * * *